United States Patent [19]

Woodward et al.

[11] Patent Number: 5,175,736
[45] Date of Patent: Dec. 29, 1992

[54] TUNABLE DYE LASER WITH THIN BIREFRINGENT FILTER FOR IMPROVED TUNING

[75] Inventors: Ben Woodward, Santa Clara; James D. Kafka, Moutain View, both of Calif.

[73] Assignee: Spectra-Physics, San Jose, Calif.

[21] Appl. No.: 446,242

[22] Filed: Dec. 5, 1989

Related U.S. Application Data

[63] Continuation-in-part of Ser. No. 260,930, Oct. 21, 1988, abandoned.

[51] Int. Cl.⁵ .............................. H01S 3/10
[52] U.S. Cl. ........................ 372/20; 372/105; 372/33; 372/108; 372/106; 372/9
[58] Field of Search ............ 372/20, 105, 33, 108, 372/106, 9

[56] References Cited

U.S. PATENT DOCUMENTS 4,914,664 4/1990 Woodward .................... 372/20

Primary Examiner—Léon Scott, Jr.
Attorney, Agent, or Firm—Ron Fish

[57] ABSTRACT

An improved dye laser having a birefringent tuning filter comprised of one or more birefringent plates wherein each plate is oriented at Brewster's angle to the resonant light beam and is an integer multiple of the thickness of the thickness of the first plate characterized by the fact that the thickness of the first plate is chosen using a new tuning relationship so that a single order tuning curve covers a tuning range of interest. This single tuning curve is almost linear throughout the tuning range and has a tuning angle at the center of the range of approximately five degrees. Also, the tuning curve has a slope throughout the tuning range which provides sensitivity of selected wavelength to tuning angle which is neither too great nor too small. A further refinement in the structure is a non-birefringent polarizing plate at Brewster's angle which increases the losses imposed upon light passing therethrough which is polarized at other than Brewster's angle. These losses extinguish the laser when turning anomalies occur near the ends of the tuning range where the wavelength and polarization suddenly jump to different values.

45 Claims, 20 Drawing Sheets

PRIOR ART TUNING CURVES

TUNABLE DYE LASER WITH THIN BIREFRINGENT FILTER FOR IMPROVED TUNING

BACKGROUND OF THE INVENTION

This invention is a continuation in part of a U.S. patent application of the same title filed Oct. 21, 1988, Ser. No. 07/260,930, now abandoned.

The invention relates to the field of continuous-wave, and synchronously pumped mode locked lasers of both the dye and solid state types. More particularly, the invention relates to the field of birefringent tuning plates for such lasers with.

Continuous-wave lasers and birefringent plates for tuning the wavelength of lasing activity have been known for quite some time. A. L. Bloom in "Modes of a Laser Resonator Containing Tilted Birefringent Plates," J. Opt. Soc. Am. 64, 447-452 (1974) first disclosed the use of birefringent plates for tuning dye lasers. (See also, G. Holtom and O. Teschke, "Design of a Birefringent Filter for High Powered Dye Lasers," *IEEE J. Quant. Elect.*, QE-10, 577-579 (1974).) However, heretofore, there has been no closed form equation for relating the wavelength of minimum loss, i.e., the lasing wavelength, to the tuning angle of the tuning mechanism although, such an equation could be derived from a paper by Lovold, et al. to be discussed in more detail below, at least for the simple cases discussed herein. (S. Lovold, P. F. Moulton, D. K. Killinger and N. Menyuk, "Frequency Tuning Characteristics of a Q-switched Co:MgF$_2$ Laser," *IEEE J. Quant. Elect.*, QE-21, 202-208 (1985).) Also, it has been noticed in prior art laser designs that tuning anomalies consisting of sudden unpredictable jumps in the wavelengths of lasing activity sometimes occur near the ends of the tuning range. To better understand these problems, some background on lasers and tuning mechanisms for same is in order.

A laser is a device that uses the principle of amplification of electromagnetic waves by stimulated emission of radiation and operates in the infrared, visible, or ultraviolet region. The term "laser" is an acronym for "light amplification by stimulated emission of radiation," or a light amplifier. However, just as an electronic amplifier can be made into an oscillator by feeding appropriately phased output back into the input, so the laser light amplifier can be made into a laser oscillator, which is really a light source. Laser oscillators are so much more common than laser amplifiers that the unmodified word "laser" has come to mean the oscillator, while the modifier "amplifier" is generally used when the oscillator is not intended.

The process of stimulated emission can be described as follows. When atoms, ions, or molecules absorb energy, they can emit light spontaneously (as in an incandescent lamp) or they can be stimulated to emit coherent, i.e., in phase, light energy by a passing light wave. Stimulated emission is the opposite of stimulated absorption, where unexcited matter is stimulated into an excited state by a light wave. If a collection of atoms is prepared (pumped) so that more are initially excited than unexcited, then an incident light wave will stimulate more emission than absorption, and there is net amplification of the energy of the incident light beam. This is the way a laser amplifier works.

A laser amplifier can be made into a laser oscillator by arranging suitable mirrors on either end of the amplifier. These are called the resonator and are sometimes referred to as defining the resonant cavity within which the lasing material is found. Thus, the essential parts of the laser oscillator are an amplifying medium, a source of pump power, and a resonator. Radiation that is directed straight along the axis of the resonator cavity bounces back and forth between the mirrors and can remain in the resonator long enough to build up a strong oscillation. Radiation may be coupled out of the resonator cavity by making one mirror partially transparent so that part of the amplified light can emerge through it. The output wave, like most of the waves being amplified between mirrors, travels along the axis and is thus very nearly a plane wave.

One way to achieve population inversion is by concentrating light as pump energy onto the amplifying medium. Alternatively, lasers may be used to optically pump other lasers. For example, powerful continuous wave ion lasers can pump liquid dyes to lase, yielding many watts of tunable, visible, and near-visible coherent radiation. Laser light is coherent in that all light of a given wavelength is in phase by virtue of the stimulated emission nature of generation of the light.

In the prior art, prisms and gratings are currently widely used with dye lasers as tuning elements. These devices are examples of spatially dispersive selectors. The attainment of high resolution with these devices requires large spot sizes at the tuning element and creates serious difficulties in the design of other parts of the laser. Tilted etalons can be used to give narrow bandwidths at particular points in the spectrum, but any one etalon has a very limited tuning range. Electrooptically tuned Lyot filters have also been used to tune laser output wavelength.

Tilted birefringent plates have also been successfully demonstrated for use as highly tunable, narrow band selection devices. This is taught in Bloom, "Modes of a Laser Resonator Containing Tilted Birefringent Plates", *Journal of the Optical Society of America*, Vol. 64, No. 4, pp. 447-452 (April 1974). The resonator in such a device contains at least one pair of surfaces oriented at Brewster's angle to the incident light rays, and a birefringent plate that is tilted and whose optic axis is out of the plane defined by the p-polarization of the Brewster windows. The term p-polarization refers to polarization where the electric vector of the light lies in the plane of the incident ray and the normal to the surface and is the normal mode of operation of such lasers. The polarization of light is the direction of its electric vector as opposed to the orientation of the magnetic vector. It is necessary to let the plate be tilted at Brewster's angle, because at that angle there is no reflection from an incident p-polarized beam.

Birefringence is the property of some materials which are homogeneous but anisotropic to have a different index of refraction for light traveling through the material in different directions. That is, the velocity of a light wave in such material is not the same in all directions. In such materials, two sets of Huygen's wavelets propagate from every wave surface, one set being spherical and other being ellipsoidal. A consequence of this property is that a ray of light striking such a crystal at normal incidence is broken up into two rays as it enters the crystal. The ray that corresponds to wave surfaces tangent to the spherical wavelets is undeviated and is called the "ordinary" ray. The ray corresponding to the wave surfaces tangent to the ellipsoids is deviated, even though the incident ray is normal to the surface, and is called the "extraordinary" ray. If the crystal is rotated about the incident ray as an axis, the ordinary ray remains fixed, but the extraordinary ray revolves around it. Furthermore, for angles of incidence other than zero degrees, Snell's law holds for the ordinary but not for the extraordinary ray, since the velocity of the latter is different in different directions.

The index of refraction for the extraordinary ray is therefore a function of direction. There is always one direction in such a crystal for which there is no distinction between the ordinary and extraordinary rays. This direction is called the optic axis.

When an incident light beam strikes a boundary between two materials having two different indices of refraction, part of the incident light energy is reflected in a reflected beam and part of it is refracted through the second materials. Brewster's angle, sometimes also called the polarizing angle, is the angle of incidence for which the reflected ray and the refracted ray are perpendicular to each other. The perpendicular relationship between the reflected ray and the refracted ray is only true when the angle of incidence of the incoming ray is equal to Brewster's angle. This is an angle between the direction vector of the incoming light beam and the normal to the surface defined by the junction between the material of two different indices. When the incident ray is at Brewster's angle, the angle of refraction becomes the complement of the angle of incidence, so that the sine of the angle of refraction is equal to the cosine of the angle of incidence.

Wavelength selection and tuning through the use of a birefringent plate in the resonator cavity comes about because the plate defines two different axes of retardation for laser energy whose electric vector is polarized along these axes. That is, retardation is the phase difference which builds up between the ordinary and extraordinary ray as they travel through the birefringent material at different speeds. When the retardation corresponds to an integral number of full wavelengths, the laser operates as if the plates were not there, i.e., in the p-polarization of the Brewster surfaces. At any other wavelength, however, the retardation is not an integer number of wavelengths and the laser mode polarization is shifted by the plate and suffers losses by reflection of energy out of the cavity with each encounter with a surface at Brewster's angle.

Tunability is achieved by rotating the birefringent plate in its own plane, because this changes the included angle between the optic and laser axes (called the tuning angle) and, hence, the effective principal refractive indices of the plate are angularly rotated. The losses imposed by the birefringent plate on wavelengths whose retardation is other than an integer multiple of one wavelength therefore prevent lasing action at these wavelengths. This is because lasing action only occurs when the output energy exceeds the input energy, and this condition will not be true at wavelengths for which the losses are too great. Therefore, lasing only occurs at a particular wavelength or group of wavelengths within the selected range having phase retardation which is at or near an integer multiple of one wavelength.

In a paper by Holtom and Teschke, "Design of a Birefringent Filter for High-Power Dye Lasers", *IEEE Journal of Quantum Electronics*, Vol. QE-10, No. 8, pp. 577-579 (August, 1974), the design of birefringent filters for the suppression of sidebands in dye lasers was discussed. The paper explains that in using a birefringent filter for wavelength tuning of a continuous wave dye laser, several crystalline quartz (quartz is birefringent) plates are inserted within the laser cavity at Brewster's angle. These laser plates both retard and polarize light passing through the cavity. It is explained that this is a variation of the Lyot filter which has separate retarders and polarizers. The tuning of such a laser structure is accomplished by rotating the assembly of quartz plates about an axis normal to the surface of the quartz plates.

The advantages of such a filter are explained to be low loss, high dispersion, small physical size, resistance to damage at high intensity, and the absence of any reflecting surfaces normal to the laser beam. However, for such a filter to be suitable for a high-gain laser, the lasing and transmission of light at frequencies other than at the desired passband must be reduced to approximately 10-20%. That is, in high-gain lasers, even though there are losses imposed on light outside the desired passband, lasing action can still occur unless the loss imposed on light outside the passband is sufficiently large to prevent the lasing criteria from being met. The problem addressed by this reference is that of incomplete polarizing leading to undesirable sideband operation. That is, incomplete polarizing action of the Brewster surfaces of the quartz plates leads to sideband transmissions. Attenuation of these sideband peaks may be increased by adding glass plates to the stack of quartz disks in order to increase the polarizing efficiency. This increased polarizing efficiency causes greater losses for light having the frequencies in the sidebands, thereby suppressing these undesired modes of operation.

In a paper by November and Stauffer, "Derivation of the Universal Wavelength Tuning Formula for a Lyot Birefringent Filter", *Applied Optics*, Vol. 23, No. 4, pp. 2333-2341, the authors discuss the nature of Lyot filters and their function in tuning to provide variable monochromatic transmission of light at wavelengths spanning the useful operating range of the filter. The authors explain that a Lyot birefringent filter is functionally a series of tuning elements each of which rotates synchronously with the other tuning elements so that the whole collection of tuning elements act as a fixed unit. Each tuning element has three optical components: an entrance polarizer, a birefringent crystal, and a quarter-wave plate. The entrance polarizer is fixed with respect to the birefringent crystal so that it divides the light in equal intensity between the two axes of different refractive index in the birefringent crystal while preserving one temporal phase; the phase of the light wave is advanced in the crystal's extraordinary axis over its ordinary axis in the birefringent crystal. The quarter wave plate following the birefringent crystal changes the phase-lap or differential retardation modulo pi into a specific angle of linear polarization. Those wavelengths of light that experience a specific fractional differential retardation are selected by a following polarizer; usually this is the entrance polarizer of the next tuning element in the series.

The partial tuning formula given by November, et al. and at page 2334 has been found experimentally by the applicant to be only partially correct. This paper does, however, give a nice background discussion of how the birefringent filter elements work. It is there stated that the linear polarizer that follows a tuning element shows maximum transmission at those wavelengths of light that experience a specific phase-delay modulo pi in passing through the birefringent crystal. The phase delay is the retardation of the crystal. The retardation is stated by the authors to be a function of the difference in refractive indices, i.e., the birefringence of the crystal, the thickness of the crystal, and the wavelength of the incident light. The transmission factor is stated to be a function of the phase delay and the angle between the tuning element and the following polarizer. As the tuning element rotates relative to the following polarizer, the maximal of transmission shifts in wavelength by the fraction of a fringe equal to the angle divided by pi. Each one-half rotation of the tuning element shifts the wavelength maximal of transmission through one full fringe and is said to span the spectral range of the tuning element.

In the Lyot design, each successive tuning element is twice the respective thickness of the previous element at its nominal operating wavelength. All the tuning elements are rotated against following polarizers to provide maximum transmission through the tuning elements at a single wavelength in a process called "alignment". This single wavelength is called a tune solution. The multiple passbands are spaced by the free spectral range of the thinnest tuning element.

In another paper by Preuss and Gole, "Three Stage Birefringent Filter Tuning Smoothly over the visible Region' Theoretical Treatment and Experimental Design", *Applied Optics*, Vol. 19, No. 5, pp. 702-710 (March 1980), it is stated that the technique of frequency selection in a dye jet laser takes advantage of the fact that a low gain laser can operate only with a polarization that is transverse magnetic (TM) with respect to any intracavity elements, oriented at Brewster's angle (windows, dye jets, or the birefringent plates themselves). A single birefringent plate has the property of transforming the incident TM polarization into some elliptical polarization composed of both TM and TE (transverse electric) linear polarization components. Conventionally, a light wave has orthogonal electric and magnetic vectors, and its polarization is stated to be the direction of the electric vector. The authors go on to state that the power transformed from the TM mode into the TE mode is no longer available to stimulate emission in the lasing TM mode. If the power loss is sufficient, lasing will cease.

The power loss caused by a birefringent filter is a function of the orientation of the birefringent plates as well as the frequency of the radiation passing through these plates. The thicknesses and orientations of the component plates in a birefringent filter are chosen so that there will be one frequency within the gain curve of the laser medium for which the polarization will be unaffected. Since this frequency component alone suffers the minimum loss, it will continue to lase while all other frequencies are suppressed. By changing the orientation of the filter, the frequency of minimum loss is changed and the laser is thereby tuned.

A useful filter must be efficient. As such, a filter tuned to the peak of the laser gain curve should cause little or no degradation of the output power. It is also important that the birefringent filter display smooth continuous tuning as the orientation of the device is gradually altered. Preuss and Gole state that this latter quality appears to be lacking for certain wavelength regions in commercially available filters. The authors go on to state a relationship between the wavelength and various angles in a typical system. However, it has been found by the applicant that this relationship does not fit experimental data, and is therefore suspect.

In the above cited paper by Lovold, et al. the authors present the most complete relationships of any known in the literature, covering the most general case where the optic axis can be at any arbitrary angle with respect to the plate normal. Because of the complexity of the relationships, a simple closed form equation cannot be derived and is not taught; moreover, the parameters of the Lovold et al. tuning equation are not all directly measurable. If the angle sigma is set to 90 degrees, then the relation can be shown to be the same as the relation shown in equation (1) herein (described more fully below), by making appropriate substitutions.

Lovold et al. claim that it is desirable for their laser to use birefringent plates with the optic axis at an angle of 35 degrees to the normal to the plane of the surface of the birefringent filter plates to achieve a high modulation depth (the ability of the filter to discriminate against undesired wavelengths); however, it is apparent that the tuning is a very steep (degree of change of wavelength of lasing per unit change in tuning angle) function of the rotation angle, rho. In the dye laser cases considered in this application, steep tuning functions are undesirable because in some situations it is desirable to tune slowly. Another reason why it is undesirable to choose solutions described in the Lovold et al. paper is that the Lovold design is very sensitive to errors in plate thickness; therefore, for both these reasons, solutions presented herein are restricted to the case where sigma (angle between optic axis and the normal to the surface of the birefringent plate) equals 90 degrees and the optic axis is 40 plus or minus 30 degrees to the plane of incidence (the plane that contains the normal and the ray).

There are several problems with the prior art continuous wave tunable lasers with respect to the prior art tuning structures. The first problem is that there is no accurate tuning equation which is available to predict the selected wavelength of lasing for a given tuning angle. At least one purported tuning equation had been put forth by the prior art as noted in the above discussion of the references. However, this tuning equation has been found by the applicant to not fit experimental data. The equations of the Lovold et al. reference are useful, but not specifically applicable to the cases of interest, especially for a visible light dye laser.

The thickness of the thinnest element of the birefringent filter tuning structure determines the characteristic tuning curves of the tuning structure. The most common, thickness in the prior art for the thinnest element is approximately 0.333 mm. Another thickness that has been used in the prior art is 0.381 mm. Neither of these thicknesses alone provides a single mode curve for all dyes in dye lasers; for example, the 0.333 mm thickness requires two orders to cover the 800–900 nm range, but is satisfactory (has one order curve) in the 700–800 nm range. The opposite is true with the 0.381 mm thickness. That plate thickness can tune over 800–900 nm on a single order curve, but not over 700–800 nm. The difficulty that this creates is that the operator must operate on one mode curve or another, and since no mode curve encompasses the entire range, such operators must operate on two mode curves to tune the laser throughout the entire range. This is inconvenient since it requires the operator to tune out to the extreme ends of one mode curve and then to reset the birefringent tuning angle a large amount to get to the next mode curve before tuning can resume. This is both inconvenient and causes errors when operating near the end of either mode curve.

As an example of these types of problems, modulation depth is much worse at the large tuning angles which must be used to reach the ends of any particular tuning curve to reach another mode curve. If modulation depth is not sufficiently high, the laser may lase at unwanted frequencies Therefore, a need has arisen for a structure for tuning, a continuous wave dye laser smoothly through each of the various dye ranges on a single order curve. Solid state lasers such as Titanium: Sapphire are subject to similar needs.

There has also arisen a need for a method of predicting the tuning characteristics of particular tuning structures based upon a tuning formula such that the appropriate thicknesses for birefringent tuning elements may be chosen to achieve single mode curve tuning throughout the desired range with good linearity and good sensitivity. Without an accurate tuning formula, the designer of a laser is left to choose between a huge number of thicknesses for the birefringent tuning plates. This requires a great deal of experimentation to find the proper thickness to achieve smooth, single mode curve tuning throughout the desired range.

Another problem which has arisen in the prior art of continuous wave dye laser tuning is that of wavelength jump. It has been noted that at high pumping energies, when a continuous wave dye laser is tuned near the end of its tuning range, there occurs a shift in wavelength back toward wavelengths in the center of the tuning range. This is an undesirable feature, since the desired tuning characteristics of a continuous wave dye laser are to smoothly tune throughout the range of operation with no discontinuities in the wavelength versus tuning angle relationship. When the ends of the tuning range are reached, it is desired that the laser simply go out, i.e., stop lasing.

Therefore, there has arisen a need for a tuning structure for a continuous wave dye laser which can eliminate these wavelength discontinuities near the end of the tuning range.

Another problem which exists in both solid state and dye lasers is tuning irregularities caused by interference effects At the surfaces of the birefringent tuning plates, there are small amounts of power from incident rays which are reflected from both surfaces of each birefringent plate. These two reflected rays are on parallel paths which are separated by a fraction of the thickness of the birefringent plate. The two reflected rays interfere at some wavelengths. This interference causes losses of power from the cavity at certain wavelengths. These losses disturb the spectral content of the tuning curve of output power versus wavelength, especially at the "wings," i.e., fringes of the curve.

Another phenomenon which has been noticed is "satellite lobes" in synchronously pumped dye lasers. These satellite lobes represent lasing activity at other than the desired frequency. It is not clear what causes these satellite lobes to appear, but workers skilled in the art postulate that they too are caused by interference effects.

Thus, a need exists for a tuning mechanism for solid state and dye lasers which can eliminate or reduce these interference effects.

SUMMARY OF THE INVENTION

According to one aspect of the teachings of the invention there is given herein a tuning equation for a continuous wave dye laser and there is described a birefringent filter tuning structure with a thin first plate with thickness selected in accordance with the guidance of the tuning equation to achieve continuous tuning on a single order tuning curve throughout the range of interest.

Also taught herein is a birefringent filter tuning structure with an additional glass polarizing element called a Brewster plate present within the resonator cavity at Brewster's angle to the laser beam. This additional Brewster plate serves the purpose of imposing additional losses upon light traveling within the resonator cavity having polarizations which are off the polarization of minimum loss selected by the tuning element. This additional Brewster plate has the effect of extinguishing the laser when the points at the end of the tuning curve are reached where the "wavelength jumpback" tuning discontinuity tends to occur, i.e., where the selected lasing wavelengths suddenly jumps back toward wavelengths in the center of the tuning range at high pumping energy. It has been noted experimentally that when this wavelength jump occurs, a similar jump in the polarization angle of the light at the new wavelength also occurs. Because the polarization changes away from the polarization of the desired wavelength, the additional Brewster plate imposes sufficient losses at the new polarization to negate the existence of the lasing criterion, thereby extinguishing the laser at the undesired wavelength.

According to another aspect of the teachings of the invention, a layer of nonbirefringent material is optically contacted (as that term is used in the art) with one or both surfaces of the birefringent tuning plates to suppress interference effects. Optical contacting means placing the birefringent and nonbirefringent materials adjacent to each other with no intervening layer of material of another index of refraction in between. This process is well known in the art. Since the thin plate is quite thin, it can conform to most irregularities which may exist on the surface of the nonbirefringent material which is in contact with the birefringent plate. Index matching oil can be used if irregularities exist which would cause an intervening layer of material having a different index to exist. The nonbirefringent material may also be deposited on the birefringent plate by suitable chemical processes. This material should have an index of refraction which substantially matches the index of refraction of the birefringent material. Most preferably, the index of refraction of the nonbirefringent material should match the average index of refraction of the birefringent material. Broadly speaking, the nonbirefringent material should be placed in optical contact with at least one surface of each birefringent plate in the laser cavity through which light in the laser cavity passes. Most preferably, the nonbirefringent material should be optically contacted to the two surfaces of the thinnest birefringent plate through which resonating light passes. The thickness of the nonbirefringent material is sufficient to separate the reflected rays from each surface of a birefringent plate so that interference between the reflected waves is reduced or eliminated.

DETAILED DESCRIPTION OF THE PREFERRED EMBODIMENT

Figure 1:
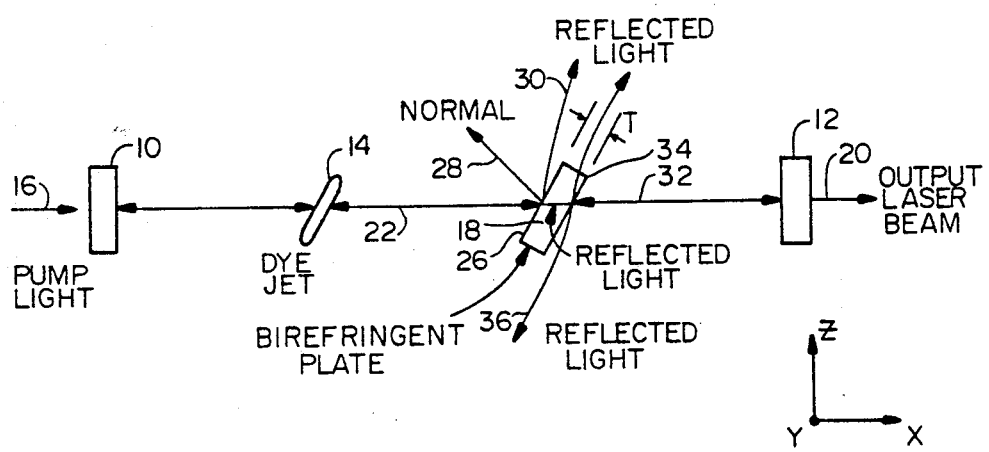
FIG. 1 shows a diagram of a typical prior art dye jet laser with a birefringent plate tuning mechanism.

Referring to FIG. 1, there is shown a diagram of a typical prior art dye laser using a birefringent plate tuning element. The dye laser is constructed having at least two mirrors 10 and 12 defining a resonating cavity therebetween. Dye jet 14 is selected to have lasing properties when pumped with sufficient energy, and is oriented in the cavity at Brewster's angle to the axis 22 of the resonating light beam. Pump energy, shown at 16 in the form of a light beam from another laser or other suitable energy source, enters the resonating cavity through partially silvered mirror 10.

When the pump light 16 illuminates the dye jet 14, population inversion occurs. That is, many of the dye jet molecules are excited to higher energy states. When any molecule decays to a lower energy state, the energy lost in this process is emitted as a photon, i.e., light. This light bounces back and forth between the mirrors 10 and 12, and each time it passes through the dye jet 14 other molecules are stimulated to drop down to a lower energy state, thereby emitting other photons in phase with the photons passing through the dye jet which caused the change in energy levels. This process is called stimulated emission and is at the heart of the lasing process.

A birefringent plate 18 at Brewster's angle serves as a tuning element. The light emitted from the dye jet 14 is emitted at many different wavelengths. Generally speaking, it is desirable to tune the laser such that only light of a particular wavelength or in a very narrow band of wavelengths is emitted from the laser. Output laser light emerges from the resonating cavity through partially silvered mirror 12 and is shown at 20. The tuning of the laser shown in FIG. 1 is done by taking advantage of the fact that a low-gain laser can operate only with the polarization that is transverse magnetic (TM) with respect to any intracavity elements oriented at Brewster's angle. The birefringent plate 18 has the property of transforming the incident TM polarization energy into some elliptical polarization composed of both TM and TE (transverse electric) linear polarization components. The power transformed from the TM into the TE mode is no longer available to stimulate emission into the lasing TM mode. If the power loss is sufficient, lasing will cease.

The power loss caused by a birefringent filter tuning plate 18 is a function of the orientation of the birefringent plate as well as the wavelength and polarization of the radiation passing through the plate. Thickness and orientation of the plate of a birefringent filter are chosen during the design process so that there will be at least one frequency within the gain curve of the laser medium for which the polarization and level of transmitted energy will be unaffected. That is, wavelength selection during tuning of the laser comes about because of the orientation and thickness of the birefringent plate. A birefringent plate defines two different axes of light transmission, each axis having a different index of refraction. This difference in index depending upon direction of travel causes different speeds of travel and results in differences in phase between light waves traveling along these axes. When the phase retardation in the birefringent plate corresponds to an integral number of full-wavelengths, the laser operates as if the plate was not there, i.e., the laser will continue to lase at the polarization which would exist if the birefringent plate 18 were not present. At any other wavelength, however, the polarization is shifted by the birefringent plate 18 and suffers losses at the surfaces of the birefringent plate. Tunability of the lasing frequency is achieved by rotating the birefringent plate in its own plane because this changes the included angle between the optic axis and the laser cavity axis. This changes the orientation of the effective principal refractive indices of the birefringent plate 18. In other words, at the selected frequency or narrow band of frequencies wherein the retardation caused by the birefringent plate 18 is equal to one full wavelength retardation, minimum loss occurs in the laser cavity at the Brewster surfaces. This frequency component will continue to lase. All other frequency components have phase retardation imposed by the birefringent plate or plates 18 which is less than or more than an integer number of wavelengths. This causes losses at the Brewster surfaces which are sufficient to extinguish the lasing activity at these wavelengths because the lasing criterion is not met. By changing the orientation of the birefringent plate 18, i.e., rotating it about the axis defined by the resonating light beam 22, the frequency of minimum loss is altered, thereby tuning the laser.

In the prior art, the birefringent plate 18 was usually comprised of multiple birefringent plates. Typically, the first birefringent plate in the group was the thinnest (but the thinnest need not be the first), and all subsequent birefringent plates had thicknesses which were integer multiples of the thickness of the first plate. Often, the second plate was four times the thickness of the first plate. Each birefringent plate had its own tuning function which was the relationship between the transmission factor or loss imposed by the plate at each wavelength.

Figure 2:
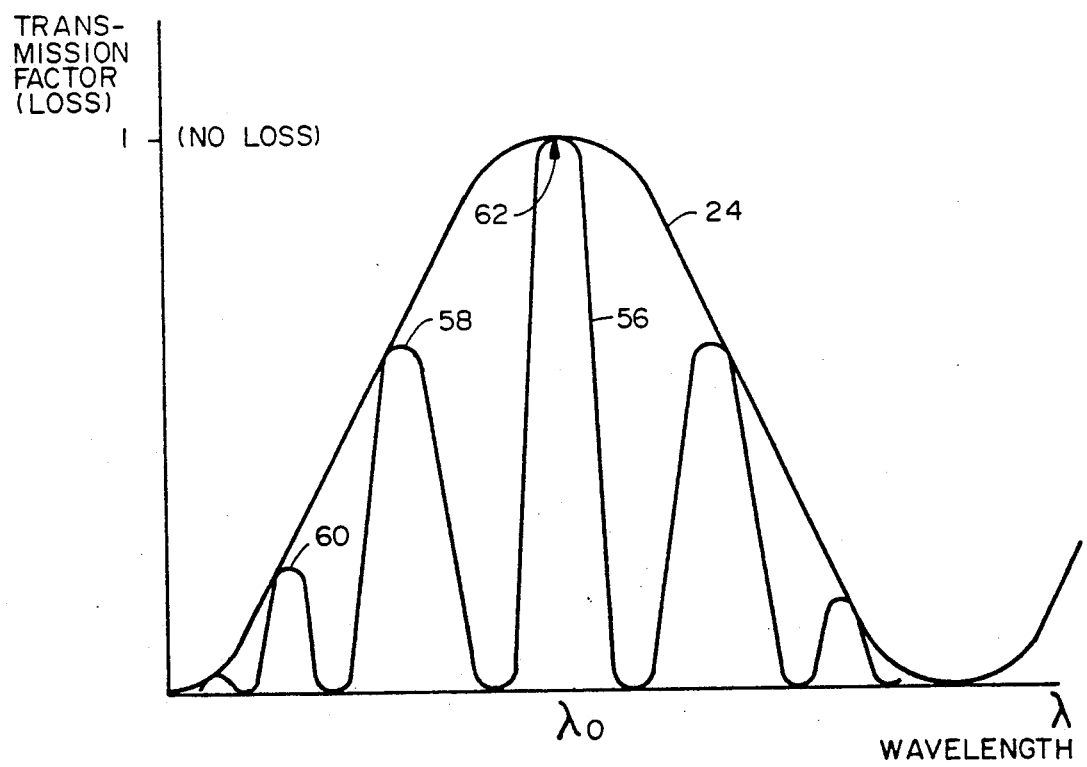
FIG. 2 shows the transmission function of a typical multiple birefringent tuning plate tuning mechanism illustrating the concepts of narrowing of the passband at the main peak and the resulting sidebands.

FIG. 2 is an illustration of the individual tuning transmission curves for a two-plate birefringent tuning filter. In FIG. 2, curve 24 represents the transmission function of the thinnest birefringent plate. It will be noticed by a study of this curve that over a relatively broad band of wavelengths centered about the center frequency, $\lambda_0$, the transmission factor is approximately 1. This means that for these wavelengths, the phase retardation imposed by the thinnest birefringent plate is an integer multiple of one wavelength or very close thereto and therefore very little loss is imposed by the birefringent plate on light passing therethrough.

Note that as the wavelength is altered either positively or negatively away from the center frequency, $\lambda_0$, the transmission factor becomes less than 1. This means that at those wavelengths, losses are occurring such that the amount of light that emerges from the thinnest birefringent plate is less than the amount of light which was incident thereon.

The loss mechanism is as follows. Assume, for purposes of discussion, that the incident ray being considered, is the incident ray 22 traveling from left to right along the X axis toward the birefringent plate 18 and impinging upon the first surface 26 thereof. The normal 28 to the surface 26 lies in the X-Z plane and the incident ray has its electric vector E aligned vertically in the X-Z plane and parallel to the Z axis. This is called p-polarization. The normal 28 of the surface 26 is at Brewster's angle to the incident ray 22. Because of this orientation and the p-polarization, little of the incident ray 22 is reflected along the path 30. Some power is reflected along path 30 however because Brewster's angle depends upon the index of refraction. For birefringent material two different indices of refraction exist. Therefore, it is impossible to obtain Brewster's angle exactly for polarizations of light incident on surface 26. Instead, substantially all of the incident energy is refracted through the birefringent plate 18 and emerges as the ray 32.

As the incident ray travels through the birefringent plate 18, it is split into an ordinary ray and an extraordinary ray. Each of these rays travels at a different speed because of the difference in the index of refraction for the two different directions of propagation. This speed difference leads to a phase difference that develops and increases as the two rays travel through the plate. If the incident ray has the wavelength $\lambda_0$, the phase of the ordinary and extraordinary ray (not shown) shifts, one relative to the other and will be different by some integral multiple of one wavelength when the rays emerge from the other side of the plate. This results in no change in the p-polarization and no losses by reflection imposed by the surface 34 at Brewster's angle.

There is only one direction in the crystal for which there is no distinction between the speed of travel for the ordinary and the extraordinary rays. This direction is called the optic axis.

As noted above, when the rays travel through the birefringent plate 18, the phase difference between the extraordinary and the ordinary rays becomes larger with increasing distance. This phase difference is called retardation. For a fixed wavelength, there will be a given distance or plate thickness wherein the phase retardation equals one complete wavelength. Likewise, there will be another thickness wherein the retardation is equal to two wavelengths. Likewise, there is a specific thickness for retardation equal to each integer multiple of one wavelength of the incident ray. For a different wavelength, these thicknesses are different.

If the thickness of the birefringent plate for a given wavelength $\lambda_0$ is such that the phase retardation is equal to an integer multiple of one wavelength at that frequency, then the refracted light beam will still have p-polarization when it reaches the second surface 34 of the birefringent plate. Since the incident light on the surface 34 is the refracted beam comprising the ordinary ray and the extraordinary ray, and since this refracted beam will still have p-polarization if its wavelength is $\lambda_0$, and since the surface 34 is at Brewster's angle relative to the refracted beam, there will be substantially no reflection from the surface 34 representing loss. Therefore, substantially no light at wavelength $\lambda_0$ will be lost from the laser beam 22 reverberating in the cavity along the X axis. Any reflection of light out of the beam 22 caused by a Brewster surface, or any other surface, represents a loss.

For wavelengths other than $\lambda_0$ where the retardation during travel through the birefringent plate 18 is less than or more than an integer multiple of one wavelength, the polarization of the refracted light beam as it impinges on surface 34 will become other than pure p-polarization. That is, there will be polarization electric vector components other than in the plane of incidence. Since only light polarized in the plane of incidence, i.e., p-polarization, will pass through the surface 34 without reflection, part or all of the light having other than p-polarization will be reflected out of the cavity at the surface 34 and will be lost. Any of the remaining light having other than p-polarization which emerges in the beam 32 will be reflected by the mirror 12 back toward the surface 34 and further losses by reflection will occur at surface 34 for those light components having other than p-polarization. This reflected light is represented by the light beam 36.

Figure 3:
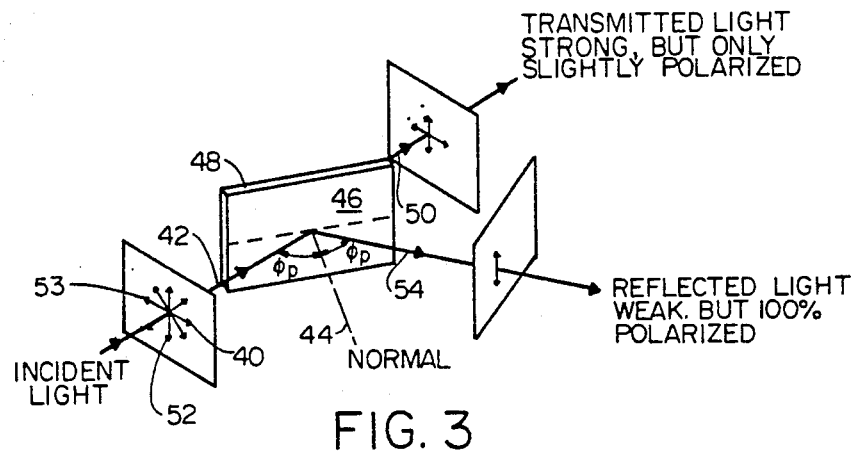
FIG. 3 illustrates the relationship between polarization and the reflected and refracted beams associated with a plate oriented at Brewster's angle in the path of a light beam.

This process can be better visualized by reference to FIG. 3, which shows in more detail the relationships between reflected light, refracted light, a Brewster plate, and the polarization vectors of incident light. In FIG. 3, the p-polarization is that polarization shown by the vector 40, which lies in the plane defined by the axis of incidence 42 and the normal 44 to the surface 46 of plate 48. The plate 48 is oriented such that the normal 44 makes Brewster's angle with the axis of incidence 42. The other polarization vectors 52 and 53 represent components of light which have had their polarizations altered away from p-polarization. Typically, this results for light at wavelengths other than the selected wavelength which have passed through the birefringent plate 18 and have experienced phase retardation when passing through said plate equal which is other than an integer number of wavelengths. This retardation results in alteration of the polarization of the light at these wavelengths other than $\lambda_0$. Upon reflection from the mirrors defining the cavity, these rays become part of the incident light beam 42. When the angle between the normal 44 and the incident ray 42 is Brewster's angle, incident light which is p-polarized, as represented by polarization vector 40, is substantially fully transmitted through the plate 48 as the refracted light beam 50. Incident light having a polarization which is perpendicular to the plane containing the normal 44 and the incident beam 42 is partially reflected as represented by the ray 54. That is, the incident light having the polarization represented by the vector 52 is partially reflected as the beam 54 and partially refracted to make up part of the ray 50. The percentage of power in beam 42 which is reflected as ray 54 versus the percentage which is refracted and transmitted through the plate 48 depends upon the index of refraction of the plate 48. Normally about 15% of the incident energy is reflected as the ray 54, with the remaining 85% transmitted through the plate 48 as part of the beam 50. Hence, the beam 50 is comprised of 100% of the incident light having the p-plane polarization and about 85% of the light having the polarization represented by the vector 52.

The incident light having polarization vectors such as the vector 52 and any of the other vectors shown in the figure other than the p-plane polarization vector 40 represents the light at non-selected frequencies which have passed through the birefringent filter plate 18 and which has encountered phase retardation during passage through the filter plate which is equal to other than an integer multiple of one wavelength. Part of this light which is polarized out of the p-polarization orientation is reflected upon each encounter with a surface at Brewster's angle. This would include encounters with the surfaces 26 and 34, as well as encounters with the two opposing surfaces of the dye jet 14, which are also oriented at Brewster's angle to the X axis. Thus, multiple reflections of these off-wavelength rays occur on each round trip between the mirrors 10 and 12 in the resonator cavity. Each of the reflections represents a loss. If the losses are sufficient, lasing at this wavelength will cease, since insufficient gain occurs on each passage through the dye jet 14. It is this loss mechanism which enables a dye jet laser to be tuned to a selected frequency.

Returning to the consideration of FIG. 2, the band of wavelengths for which the transmission factor is close to 1 is relatively large. It is desirable to have a very narrow range of frequencies over which the laser will lase. Accordingly, it is a common practice in the prior art to add additional birefringent plates in the path of the light beam inside the resonator cavity such that light passing through the first birefringent plate 18 must also pass through these subsequent birefringent plates. Because the subsequent birefringent plates are made with a thickness which is an integer multiple of the thickness T of the thinnest birefringent plate in the cavity, if the light passing through the first birefringent plate is of such a wavelength so as to experience a phase retardation which is an integer multiple of that wavelength, then upon passage through subsequent plates which are multiples of the thickness of the first plate, the light will experience phase retardation which is also an integer multiple of the wavelength in each subsequent plate. Therefore, this light will experience little or no loss in passing through subsequent plates. However, light having a wavelength outside the band of desired wavelengths will suffer losses in the subsequent plates in addition to the losses suffered in the first plate. For a typical installation wherein a second plate having four times the thickness of the first plate is present, the transmission factor versus wavelength function is as shown at curve 56 in FIG. 2 Note that the curve 56 has a peak at the wavelength $\lambda_0$ which is the same or very nearly the same as the peak for the transmission function 24 for the thinnest birefringent plate. Note also that multiple other peaks are present such as those shown at 58 and 60. These other peaks are referred to as sidebands and represent problems in high-gain lasers.

The presence of sidebands means that lasing can occur at wavelengths in the sideband peaks where no lasing is desired. This is especially true in high-gain lasers where the losses imposed upon light at the frequency of the sideband peaks may not be sufficient to prevent lasing at these wavelengths. The paper by Holtom and Teschke cited above, describes a structure to attenuate sideband peaks to eliminate the aforementioned problem. These workers in the art added additional glass plates to the stack of birefringent quartz plates such as the plate 18 in FIG. 1. The purpose of these additional glass plates placed in the cavity at Brewster's angle was to increase the polarizing efficiency. These same glass plate structures are used in accordance with the teachings of the invention for a different purpose and to achieve a different result, as will be described in more detail below.

The desirable aspect of introduction of subsequent birefringent plates into the resonator cavity is that the passband for lasing activity can be substantially narrowed. As can be seen from a study of the main peak at 62 of the function 56, a much narrower band of frequencies exists for the function 56 where the transmission factor is 1 or near 1. Thus, frequencies which have a transmission function which is near 1 for the transmission function 24 but which is not near 1 for the transmission function 56 will have losses imposed thereon by the second birefringent plate and possibly by other birefringent plates whose transmission functions are not shown in FIG. 2. The passband can thus be narrowed substantially through the use of the subsequent plates.

Figure 4:
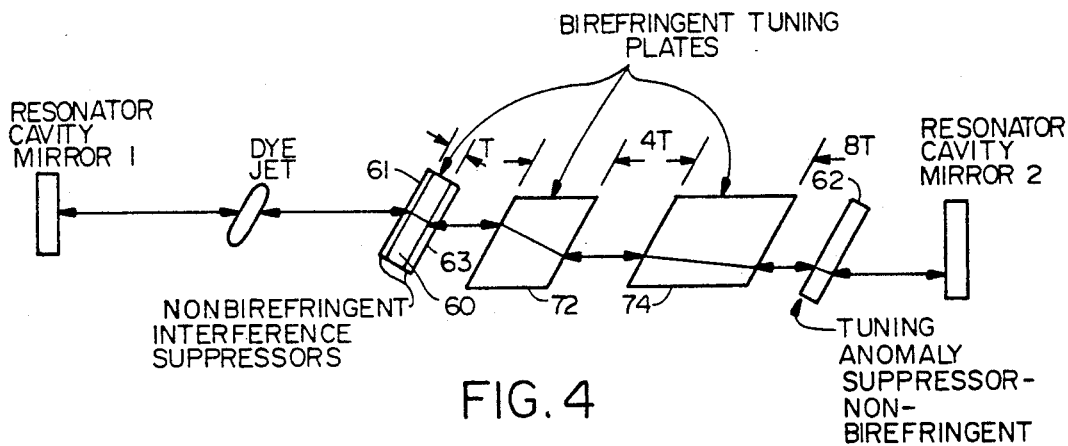
FIG. 4 illustrates a tuning structure according to the teachings of the invention including a multiple birefringent plate with a first plate of a specific thickness and an additional Brewster plate for tuning anomaly suppression and with nonbirefringent substrates optically contacting the thinnest birefringent tuning filter plate to suppress interference effects.

Referring to FIG. 4, there is shown a diagram of the preferred embodiment of a laser according to the teachings of the invention. There follows a detailed mathematical derivation of the relationship between the various design criteria such as plate thickness, index of refraction and various angles in the system, including the tuning angle, and the wavelength at which the system will lase.

The concept of using one or more birefringent plates to tune a dye laser has been used for over a decade. (A. L. Bloom, "Modes of a Laser Resonator Containing Tilted Birefringent Plates," J. Opt. Soc. Am. 64, 447-452, (1974); G. Holtom and O. Teschke, "Design of a Birefringent Filter for High-powered Dye Lasers," IEEE J. Quant. Elect, QE-10, 577-579, (1974).) Several papers (A. L. Bloom, "Modes of a Laser Resonator Containing Tilted Birefringent Plates," J. Opt. Soc. Am. 64, 447-452, (1974); G. Holtom and O. Teschke, "Design of a Birefringent Filter for High-powered Dye Lasers," IEEE J. Quant. Elect., QE-10, 577-579, (1974); D. R. Preuss and J. L. Gole, "Three-stage Birefringent Filter Tuning Smoothly over the Visible Region: Theoretical Treatment and Experimental Design," Applied Optics 19, 702-710, (1980); S. M. Mudare and D. C. O'Shea, "Simple Alignment Procedure for the Assembly of Three-plate Birefringent Filters for Tunable Dye Lasers," Applied Optics 22, 640-641, (1983); L. J. November and F. R. Stauffer, "Derivation of the Universal Wavelength Tuning Formula for a Lyot Birefringent Filter," Applied Optics 23, 2333-2341, (1984)) have gone into various details of theory, construction, alignment, and application; however, as far as the applicant is aware, the only directly experimentally verified tuning curve was reported in Lovold, et al. S. Lovold, P. F. Moulton, D. K. Killinger, and N. Menyuk, "Frequency Tuning Characteristics of a Q-switched Co:MgF$_2$ Laser," IEEE J. Quant. Elect. QE, 202-208, (1985)) for applications involving a wavelength range quite different from that used in dye lasers. The Lovold, et al. tuning equation was a function of several quantities which are not directly measurable in a lab. Without the ability to measure various criteria and observe results, design criteria could not be proven; moreover, no adequate explanations were available for the irregular tuning often observed.

The purpose of the following analysis is to derive a mathematical tuning equation expressed in terms of physically measurable quantities. This provides a means for improving birefringent filter performance by enabling predictions of improved performance for various design changes. Specifically, it provides a means to avoid order jumps during tuning over a single dye, a means to make tuning reliably smoother, and a means by which to design filters for a range of useful operation wider than a single dye order curve. As a result of this work, a design of a birefringent filter specifically for a cw Ti:Sapphire laser, tuning continuously from <700 nm to >1100 nm has been achieved.

Mathematical Derivation of a Tuning Equation

The geometry and quantities involved in the following mathematical derivation can be understood by reference to FIG. 5. The phase retardation of a wave passing through a birefringent plate is given by $$\delta = \frac{2\pi(n_e - n_0)T\sin^2\gamma}{\lambda\cos\theta_r} \quad (1)$$

where $\gamma$ is the angle between the optic axis c and the light ray in the plate, $\theta_i$ is the angle of incidence, and $\theta_r$ is the refraction angle. FIG. 5 shows the geometry considered in the general case of a birefringent filter plate at an angle $\theta_i$ to the incident beam. For simplicity, consider only the case where angle $\epsilon = 0$; furthermore, the filters are used only at Brewster's angle, where $\cos\theta_r = \sin\theta_i$.

In that case, $$\sin^2\gamma = 1 - \cos^2\alpha \frac{\sin^2\theta_i}{n^2} \quad (2)$$

and so, $$\delta = \frac{2\pi\Delta nT}{\lambda\sin\theta_i}\left(1 - \cos^2\alpha\frac{\sin^2\theta_i}{n^2}\right) \quad (3)$$

where $\Delta n \equiv n_e - n_0$ and $n_e$ is the index of refraction for the extraordinary ray and $n_0$ is the index of refraction of the ordinary ray in the birefringent material. (4)

Sometimes it is convenient to define $$\phi = \alpha + \frac{\pi}{4},$$

so that $\phi = 0$ when $$\alpha = -\frac{\pi}{4}. \quad (5)$$

Then, $$\cos^2\alpha = \tfrac{1}{2}(1 + \sin 2\phi). \quad (6)$$

Finally, to get the wavelength dependence, impose the condition that $$\delta = 2\pi m \text{ (m integer)} \quad (7)$$

so $$\lambda = \frac{\Delta nT}{m\sin\theta_i}\left[1 - \frac{\sin^2\theta_i}{2n^2}(1 + \sin 2\phi)\right] \quad (8)$$

Figure 6:
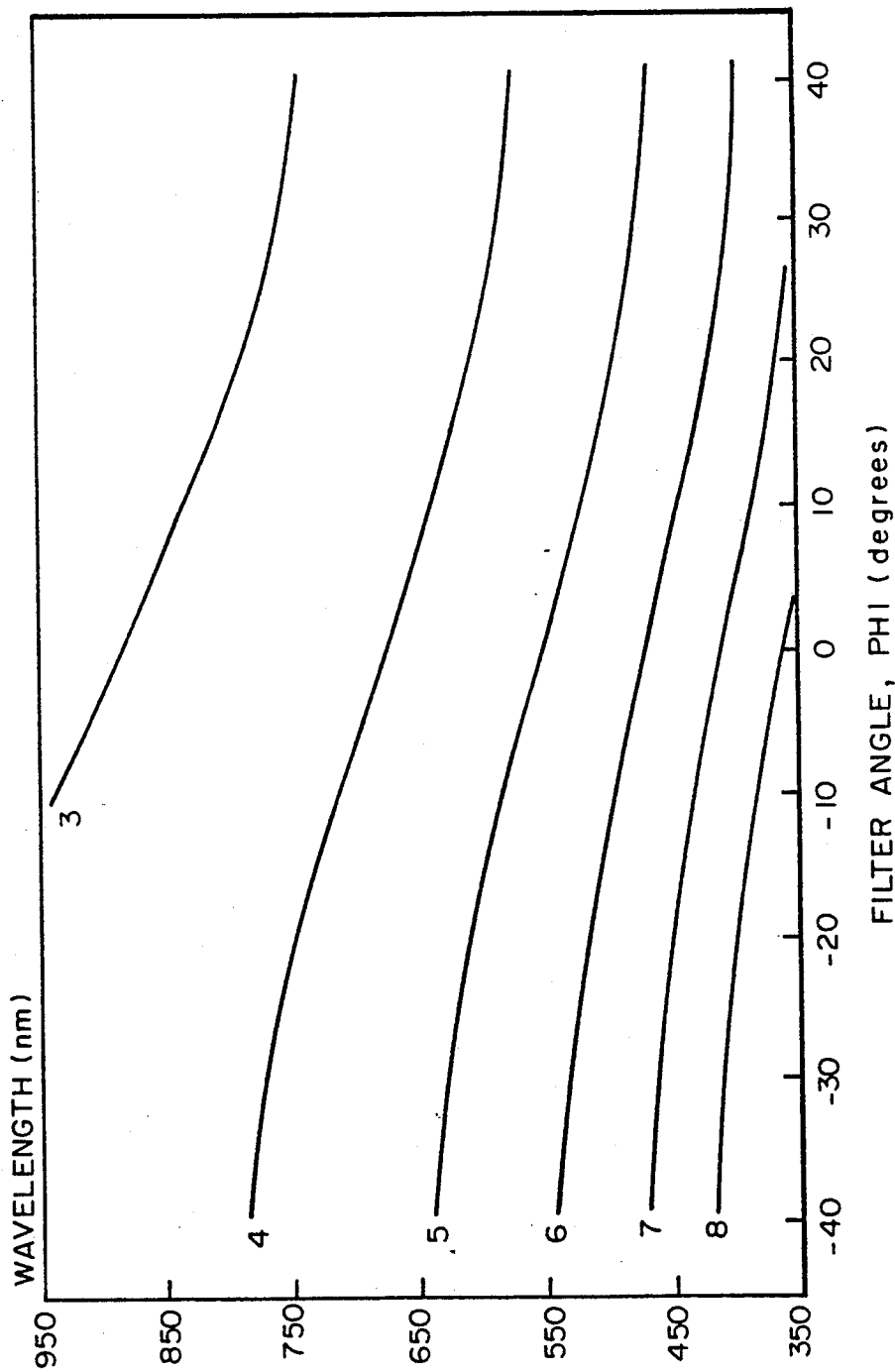
FIG. 6 is a graph of a typical family of tuning curves for T=0.33 mm.
Figure 7:
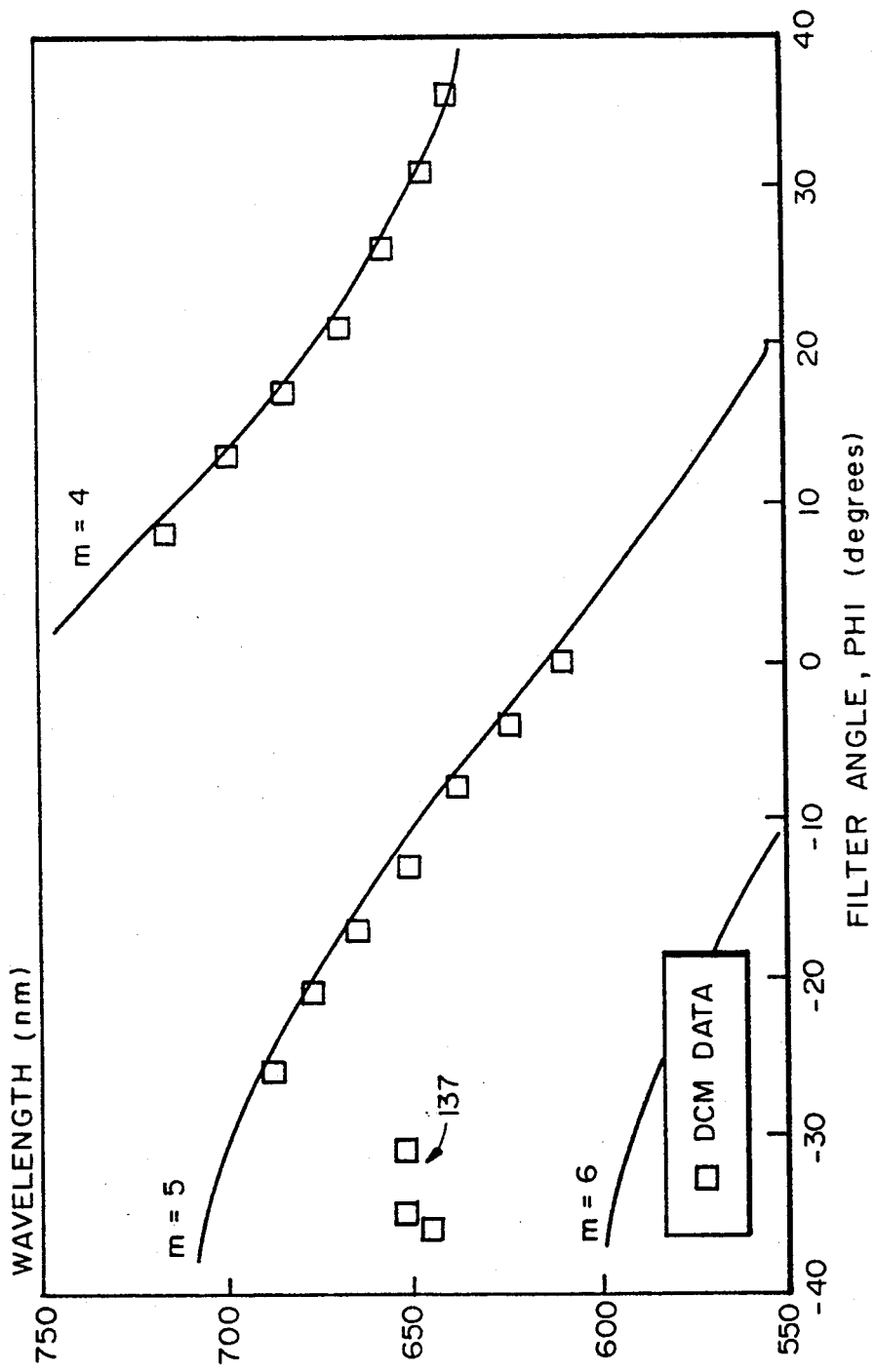
FIGS. 7 and 8 are experimental tuning results for T=0.33 mm and T=0.30 mm, respectively.
Figure 8:
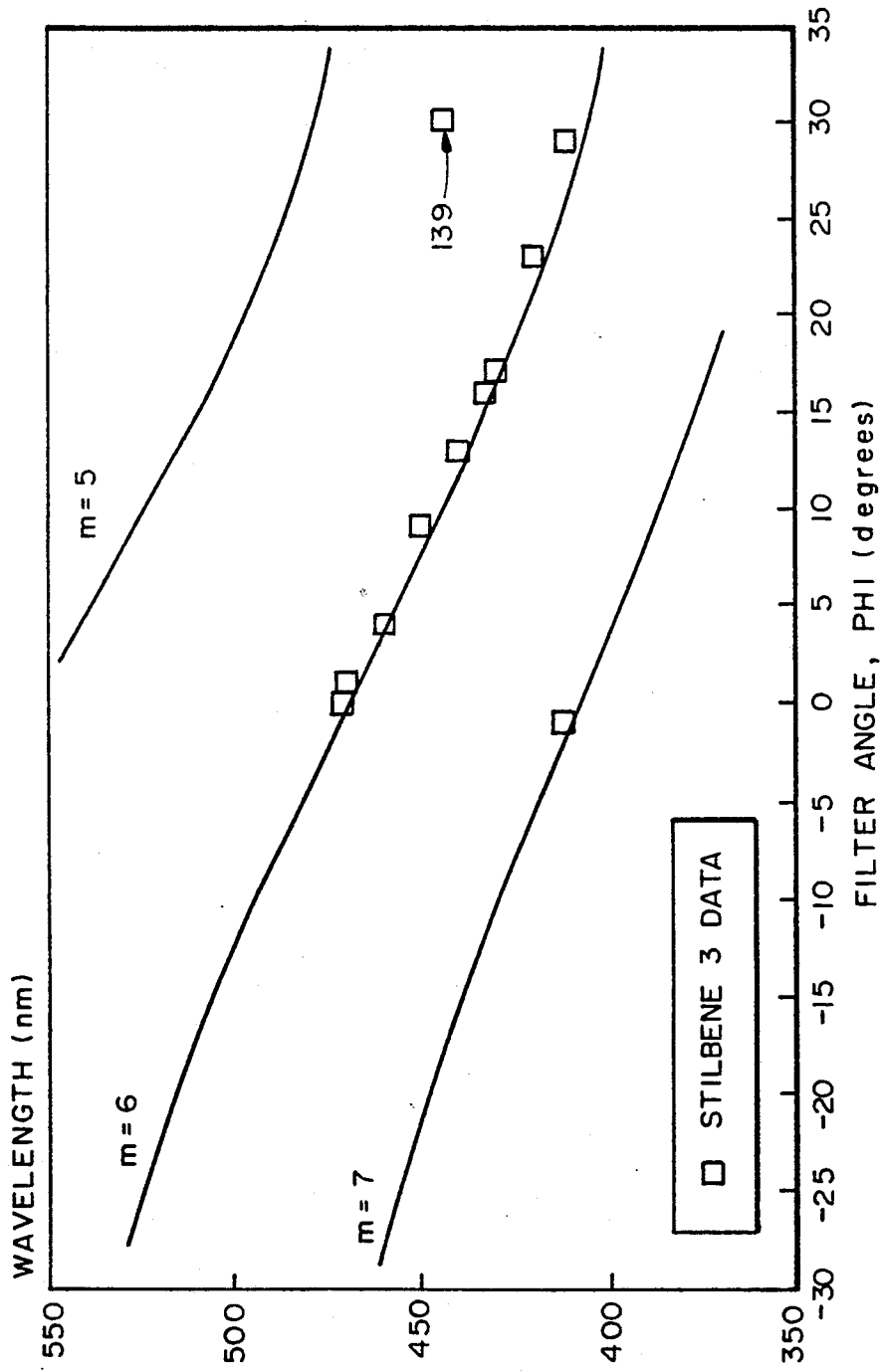

This tuning equation has been verified experimentally in several wavelength ranges from 400 to 1100 nm. Solutions for a typical plate thickness are graphed in FIG. 6, and experimental results are shown in FIGS. 7 and 8.

Free Spectral Range of Filter

By analogy to etalon nomenclature, we define the Free Spectral Range (FSR) of the filter as the separation between transmitted orders: i.e., the vertical separation between curves When the dye tuning range is longer than the filter FSR, the operating wavelength will jump to the order having more gain, giving incomplete tuning. This effect is commonly observed in Stilbene 3 which has a large tuning range compared with the center wavelength.

What is the expected FSR? Since $$\lambda = \frac{\Delta nT}{m} f(\theta, \phi) \quad (9)$$

then $m\lambda_1 = (m-1)\lambda_2 = \Delta nT f(\theta, \phi) \quad (10)$ $$FSR \equiv \lambda_2 - \lambda_1 = \frac{\lambda_2}{m}\left(\alpha \frac{T}{m^2}\right) \quad (11)$$

It's not surprising, then, that the problem occurs in Stilbene 3, where $\lambda_2 = 480$ nm and $m = 6$ or 7. By using a thinner plate and $m = 6$, the FSR was increased 14%.

There is a problem in tuning when the Free Spectral Range is too small. This problem and its solution according to the teachings of the invention will be discussed in more detail below.

Single Order Tuning

With any one filter design of the type where the c-axis is in the plane of the plates, one or more of the red and infra-red dyes will require more than one order for complete tuning. For example, note the DCM dye data in FIG. 7. A large angle reset is needed to tune over the entire dye range; furthermore, the spectral sensitivity (modulation depth) of the filter degrades near the ends of the tuning ranges (where $\phi = +-45$), further limiting the useful tuning range of a given birefringent filter. Even though no one design can give continuous tuning on all dye ranges, two different thin plate thicknesses can be found such that all dyes are reasonably centered in one or the other of the filters. A 0.30 mm filter tested in DCM and Styryl 9 could be tuned over the entire desired range on a single order, as predicted.

Tuning Range

It is useful to allow a single filter to be used for several dyes. As discussed above, two groups of dyes are identified, each to be tuned by a filter characterized by a unique thin plate thickness. When the dye ranges vs. angle are overlaid, it is apparent that the problem reduces to extending the tuning range as a function of the filter rotation angle, $\phi$.

To optimize the tuning range on any order of the filter, it is necessary to determine the effect of thickness, parallelism, and axis errors on filter performance. The analysis is complicated by the benefits of the compensation procedure, in which a small rotation of one plate with respect to the others can compensate to a first order for small errors in these parameters. After replication of the alignment procedure on a computer, it was found that a second order error remains with a minimum or maximum at $\phi = 5°$. This result was verified by algebraic analysis.

The maximum allowed wavelength variation is found as follows (this analysis assumes the optic axis in the plane of the filter element, but very similar results are found in the more general case).

The single pass transmitted intensity, I, is given by $$I = \cos^2 \frac{\delta}{2} = \cos^2\left[\frac{\pi \Delta n T}{\lambda \sin\theta_i}\left(1 - \frac{\sin^2\theta_i}{n^2}\cos^2\alpha\right)\right] \quad (12)$$

At the $\delta = 0, \pi$ values, the first derivative vanishes, so $$\Delta I = \tfrac{1}{2}\left(\frac{d^2 I}{dx^2}\right)\Delta x^2 \quad \text{for } x = \lambda, T, \theta_i \quad (13)$$

and at $\delta = 0, \pi$ $$\lambda = \frac{\Delta n T}{m \sin\theta_i}\left(1 - \frac{\sin^2\theta_i}{n^2}\cos^2\alpha\right) \quad (14)$$

Experimental evidence suggests that the single pass transmission should be $>0.99$, so the largest $\Delta I = 0.01$. Then the maximum allowed $\Delta\lambda$, $\Delta\lambda_{max}$ is given by $$\Delta\lambda_{max} = \frac{.1\lambda}{\pi m} \quad (16)$$

Remember that, in the 2nd and 3rd plates, m is some integer multiple of the 1st plate m value, say $p_2$ or $p_3$. Since $\lambda$ is already inversely proportional to m, the most severe wavelength variation occurs at the shortest wavelengths, typically about 420 nm where m (first plate) = 6 or 7. In that case, the smallest allowed wavelength "error" is about 0.48 nm for a 2nd plate when $p_2 = 4$. Similarly, the allowed wavelength error for the third plate is $p_3$ times smaller than $\Delta\lambda_{max}$.

Tolerance on Thickness

Figure 5:
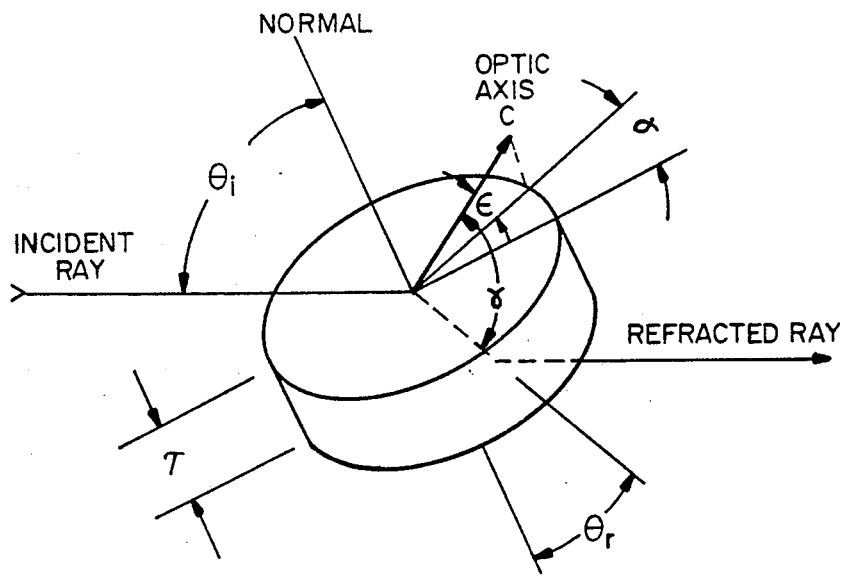
FIG. 5 is a diagram illustrating the geometry used to derive the tuning equation according to the teachings of the invention.
Figure 9:
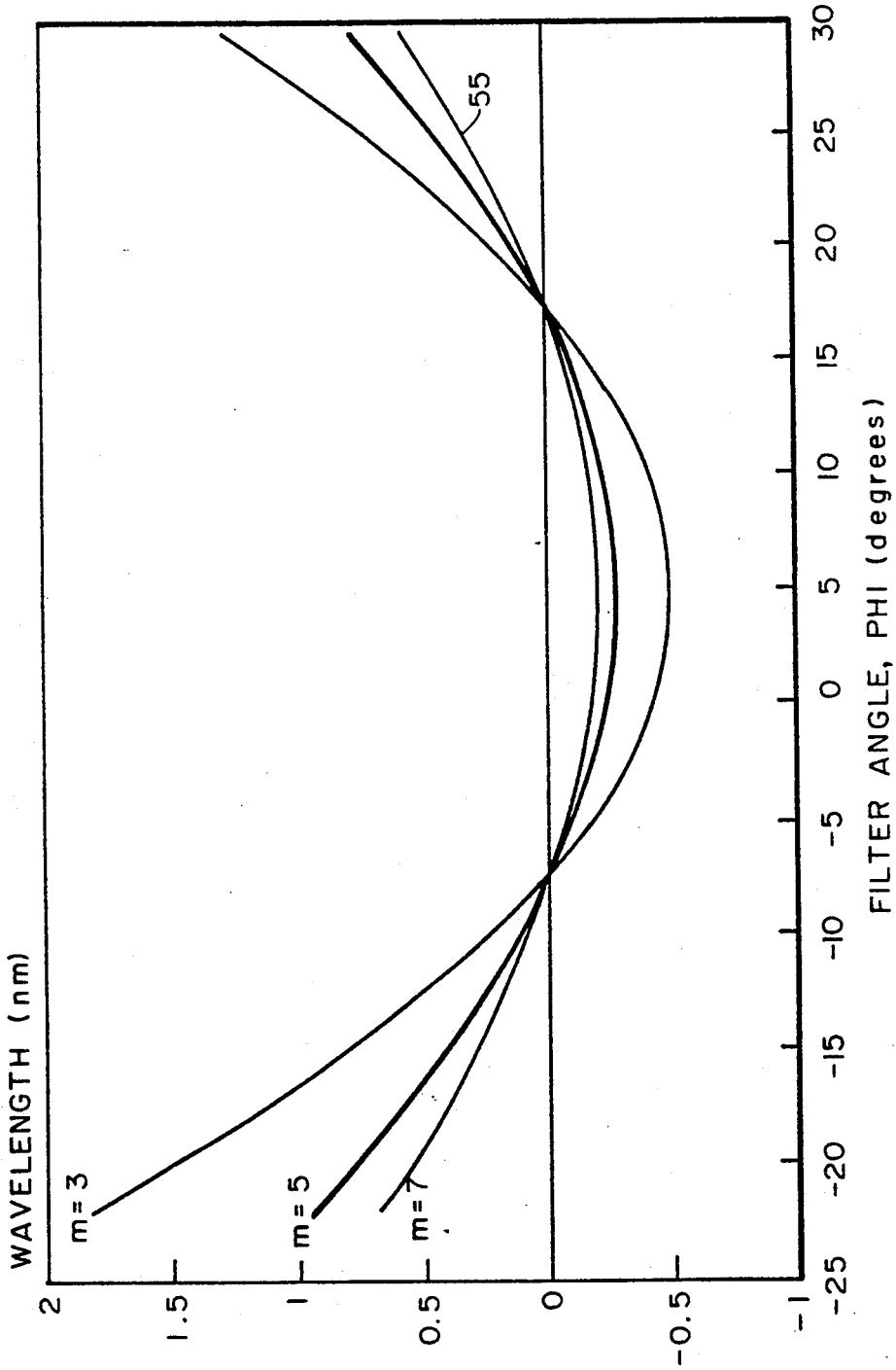
FIG. 9 is a graph of birefringent plate tuning error caused by deviation of plate thickness of the multiple tuning plates from integer multiples of the thickness of the thinnest plate.

Referring to FIG. 9, there is shown a plurality of computer generated "error" curves for a 2nd plate thickness tolerance of 7 μm in FIG. 5. The curve 55 for $m = 7$ is adjusted (by rotation of the 2nd plate with respect to the 1st) to give a wavelength error of $-0.2$ nm near the center and about $+0.5$ near the ends of the tuning range. Over 90% of the operating range, the filter will be characterized by a wavelength error less than $\tfrac{1}{2}$ of the allowed maximum; and on lower orders (longer wavelength), the error is even smaller.

The third plate thickness tolerance turns out to be the same. Although the wavelength error budget is smaller, a 7 μm thickness error gives a proportionally smaller wavelength error, because $\lambda$ is proportional to T/m. Equivalently, consider that the thickness tolerance is independent of thickness, because a given value represents a fixed rotation of the polarization vector.

Tolerance on $\theta_i$ Or Errors In Parallelism

Figure 10:
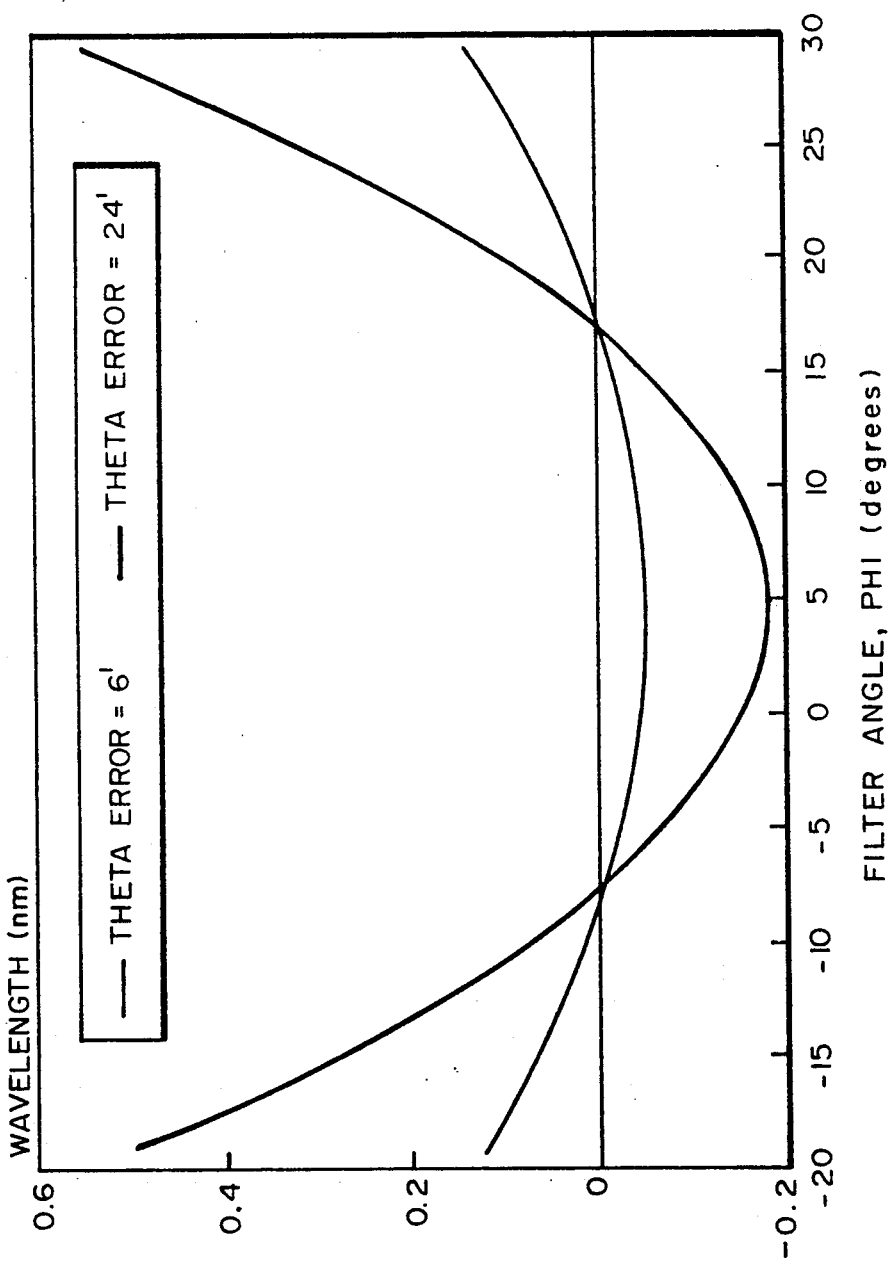
FIG. 10 is a tuning error curve for errors in parallelism between the multiple tuning plates.

Referring to FIG. 10, there is shown a family of error curves for errors in parallelism between the plates of the birefringent filter. With a similar approach $\lambda$'s can be calculated for slightly different input angles, $\theta_i$. Subtracting those results from the $\lambda$s at the nominal $\theta_i$, generates an error curve. Again, adding a fixed offset rotation, $\Delta\phi$, it is possible to eliminate the first order error term, and the resulting parabola is centered just where the $\Delta\lambda$, ($\Delta T$, $\phi$) curve is. The errors at $m = 6$ are $\tfrac{1}{2}$ those for $m = 3$, so again the most sensitive case is at short wavelength. In FIG. 10, error curves are generated with 6 minute and 24 minute variations in $\theta_i$, respectively. As before, the results are about $\tfrac{1}{2}$ of allowed values for $\Delta I = 0.01$ over most of the range of interest.

Tolerance on $\epsilon$, Crystal Axis

Figure 11:
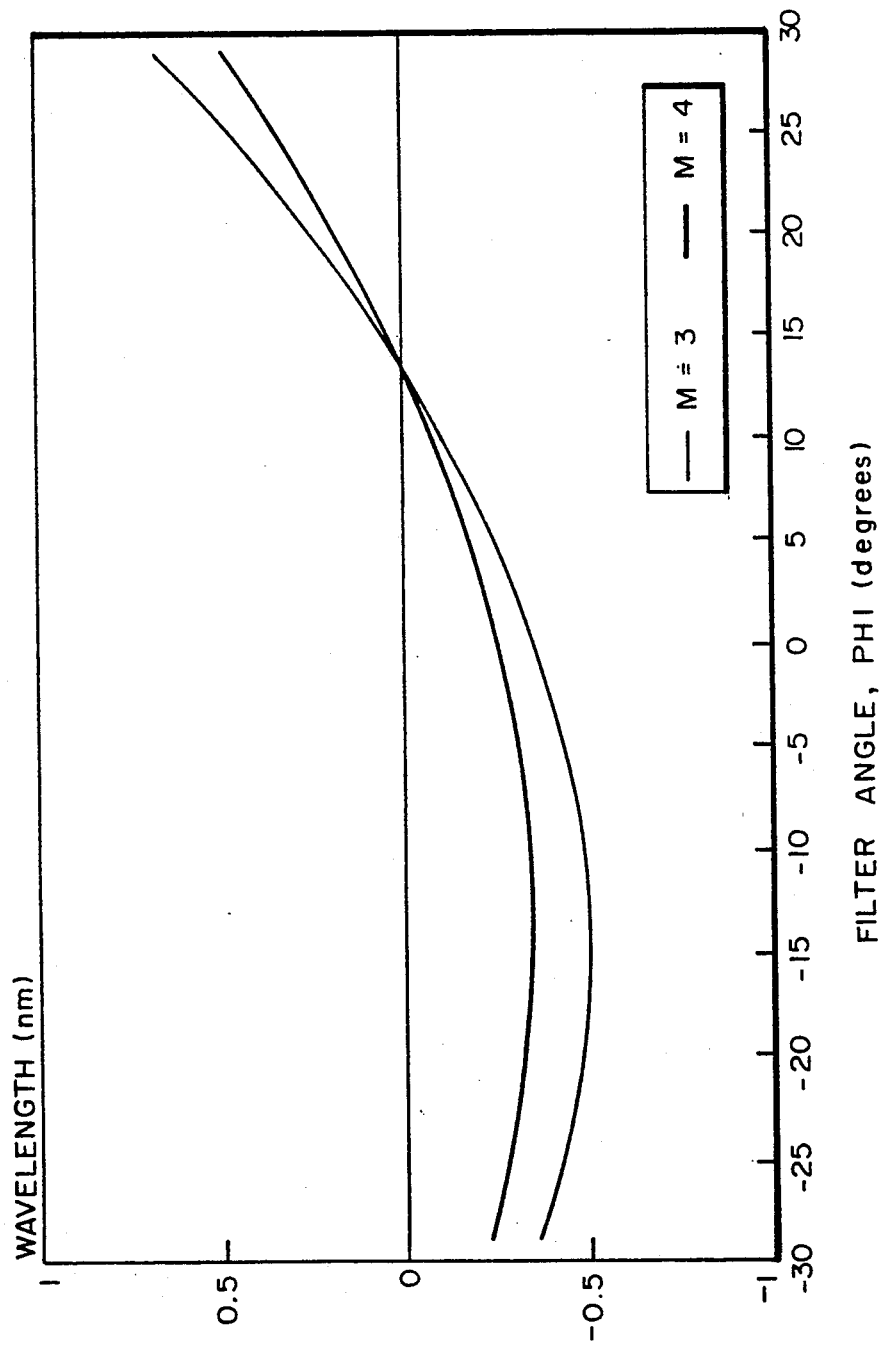
FIG. 11 is a tuning error curve showing the effects of misalignment of the optic axis of the various filter plates.

Referring to FIG. 11, there is shown a family of tuning error curves for errors of alignment of the crystal axis angle, $\epsilon$. Using equation (6) from Lovold (S. Lovold, P. F. Moulton, D. K. Killinger, and N. Menyuk, "Frequency Tuning Characteristics of a Q-switched Co:MgF$_2$ Laser," IEEE J. Quant. Elect. QE-21, 202-208, (1985)), one can calculate a wavelength sensitivity to the crystal axis angle, $\epsilon$, of 9 nm/degree, at $\phi=45°$. But this is also a worst-case situation, since the compensation procedure allows some correction; however, in this case, the minimum/maximum of the curve is at $\phi=$about $-15°$, with a zero in the range of interest only at positive $\phi$. See FIG. 11 for the error curve results obtained axis misalignment of $\epsilon=5$ minutes. Since this curve is differently shaped than the others, the tolerance on $\epsilon$ will have to be somewhat smaller, since the compensation procedure will not be optimum for this error.

Optic Axis Out of the Plane of the Plate

Lovold, et al. make a case for choosing the optic axis other than in the plane of the plate, primarily to get tunability in a broad wavelength range with good modulation depth.

Application of the equations given in Lovold, et al. to a specific problem at hand, however, led to a different conclusion than Lovold, et al. reached. Tuning curves with $\epsilon>>0$ in the near infra-red are much steeper than those shown here for the $\epsilon=0$ case. Since these steep tuning curves are widely separated in wavelength, one would expect a large bandwidth to be characteristic of such a filter.

Another drawback to using the optic axis at some angles is that the tuning angle $\phi$ for minimum sensitivity to plate thickness and parallelism errors stays near 5°. Therefore, a wide range of optic axis angles is excluded, because the modulation depth is poor in the range of tuning angles with low losses.

Tuning Problems: Interference Effects

Birefringent filters have been plagued by tuning irregularities and even discontinuities. These problems have been thought to arise from poorly designed or constructed filters. However, the tolerance analyses given above predict power losses not wavelength shifts with design and construction problems. In fact, all birefringent filters are subject to tuning irregularities which look like etalons of almost the thin plate thickness. These effects are readily apparent in 1-plate filters in the thickness range from 0.26 to 0.388 mm, with the effect more pronounced in the thinner plates. Effects are also apparent in 2-plate filters under certain conditions, but are unusual in 3-plate filters. These interference effects have been called "fluctuations," or "lumpy tuning," in which spectral amplitude and line width change significantly over just a fraction of the dye tuning range. As one tunes the filter, the spectral content of the laser output varies as shown in FIGS. 12(a) through 12(g). FIGS. 12(a) through 12(g) represent typical output power versus frequency curves for each of seven different tuning angles in a weaker gain dye. The interference effect being discussed here also occurs in higher gain dyes but the disturbance to the spectral content of the output light is different as will be illustrated below.

Figure 12:
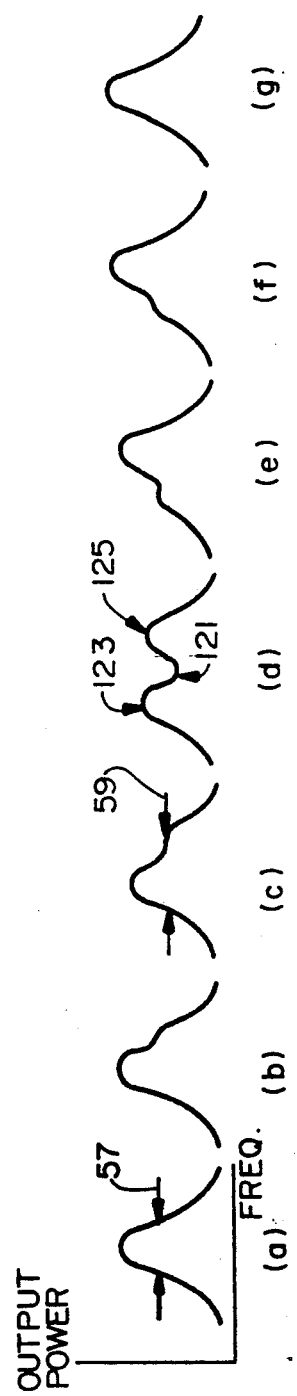
FIG. 12 is a series of spectral intensity curves illustrating the effect of interference.

FIG. 12(a) represents a desirable spectral content of the laser output power, i.e., a more or less normal distribution of power around the peak power wavelength where the phase retardation in the birefringent filter is equal to an integer multiple of one wavelength. Note the relative bandwith of the spectrum at the half maximum point illustrated at 57 in FIG. 12(a).

FIGS. 12(b) and 12(c) represent the spectral content of two different tuning angles. Note that the spectral content has shifted such that a normal distribution no longer exists and the bandwidth at the half maximum point has substantially increased. This shift in spectral content results from losses in power from the cavity at certain wavelengths caused by interference.

FIG. 12(d) represents the tuning angle at which the interference has the most deleterious effect on the spectral content of the output. FIGS. 12(e), (f) and (g) represent other tuning angles where the interference effect slowly disappears until the spectral power is back to a normal distribution in FIG. 12(g).

Figure 13:
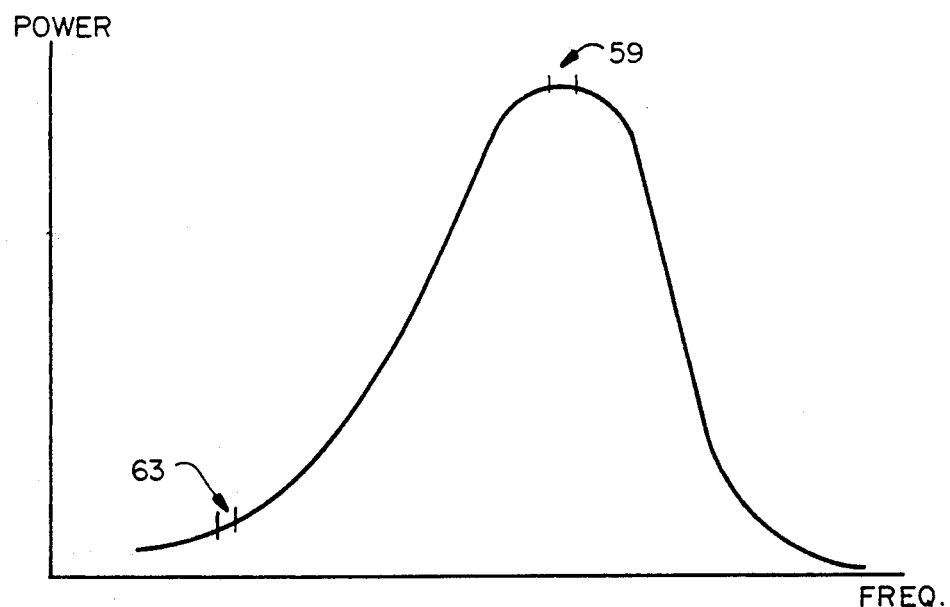
FIG. 13 is a spectral intensity curve for a single tuning angle.

FIG. 13 shows the normal distribution of spectral power for a high gain dye on an expanded scale.

Figure 14:
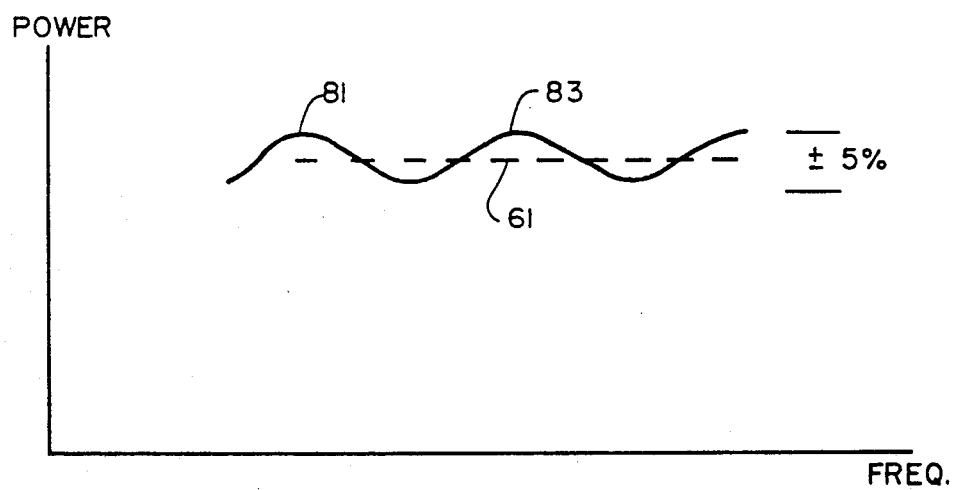
FIG. 14 illustrates the effect of interference on the locus of the peak power point for changing tuning angles.

FIG. 14 illustrates that the power at the peak of the spectral distribution wave actually varies sinusoidally with tuning angle and wavelength whereas an essentially flat distribution of power would normally be expected with changing tuning angle as shown at 61. This sinusoidal variation in power distribution is caused by the interference effect. The sinusoidal effect results from the gradual shifting from constructive to destructive interference as the lasing wavelength changes.

Figure 15:
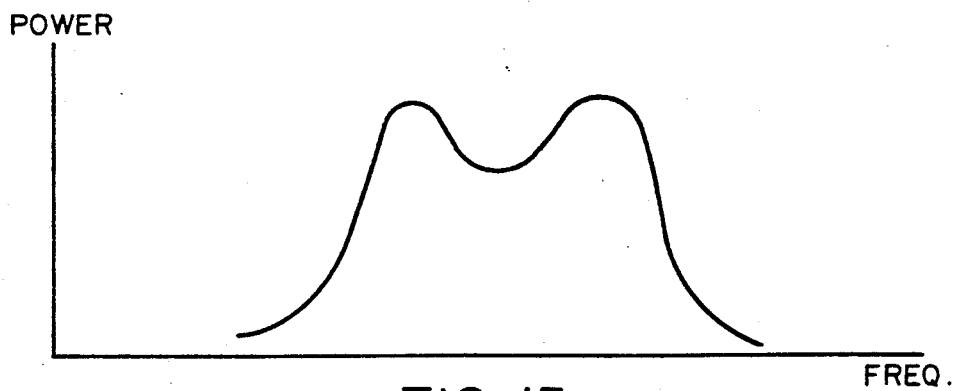
FIG. 15 illustrates the spectral intensity when the interference is constructive.

FIG. 15 illustrates a typical spectral power distribution when constructive interference is occurring.

These same interference effects have been noted in solid state lasers using, for example, Ti:Sapphire as the lasing medium.

Figure 16:
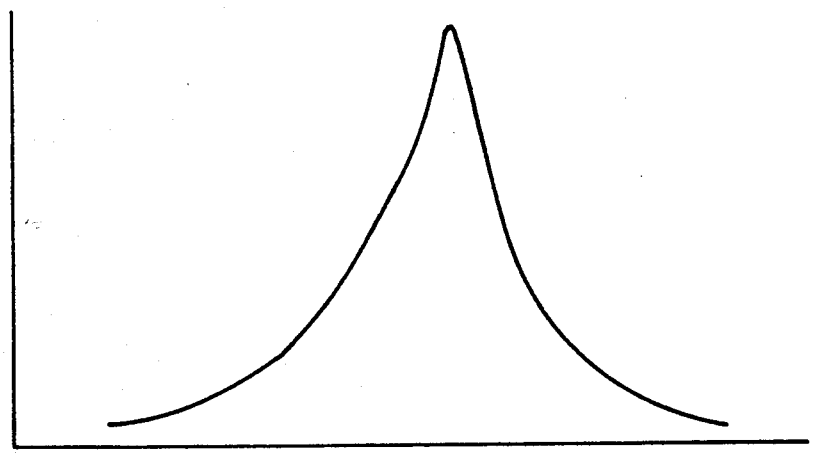
FIG. 16 illustrates the desired autocorrelation function for a synchronously pumped mode locked laser.
Figure 17:
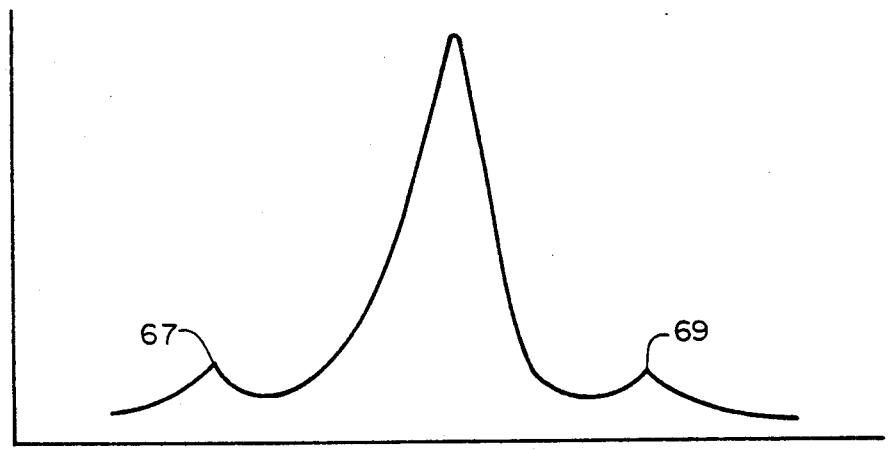
FIG. 17 illustrates the satellite lobes in the autocorrelation function for synchronously pumped lasers if interference occurs.

FIG. 16 illustrates the desired pulse shape for synchronously pumped dye lasers. FIG. 16 is the autocorrelation function. For reasons which are not totally clear, for synchronously pulsed dye lasers not using pulse compression or where the pulse width is greater than approximately 2 pico-seconds, certain satellite lobes can appear in the autocorrelation function. These satellite lobes are illustrated at 67 and 69 in FIG. 17. It is believed that interference effects cause the satellite lobes 67 and 69. Typical transit time for the resonating pulses through the birefringent filter plates is 1 picosecond. Thus, round trip transit time for a ray refracted to the opposite surface of the birefringent plate and then reflected back to the incident surface is 2 picoseconds. It is these reflected rays which interfere with rays reflected from the incident surface, but this interference cannot begin until 2 picoseconds after arrival of the first ray. Thus, for pulse durations less than 2 picoseconds such as are commonly found in mode locked, synchronously pumped lasers using pulse compression of the pumping pulses, no satellite lobes are found. For pulse durations greater than 2 picoseconds, the satellite lobes can be reduced or eliminated by the addition of optically contacted, non-birefringent, index matched transparent material to the opposing surfaces of the birefringent plates. It has been found that approximately 1 millimeter of KZF1 glass on each surface will substantially reduce or eliminate interference effects such as mentioned above.

Figure 18:
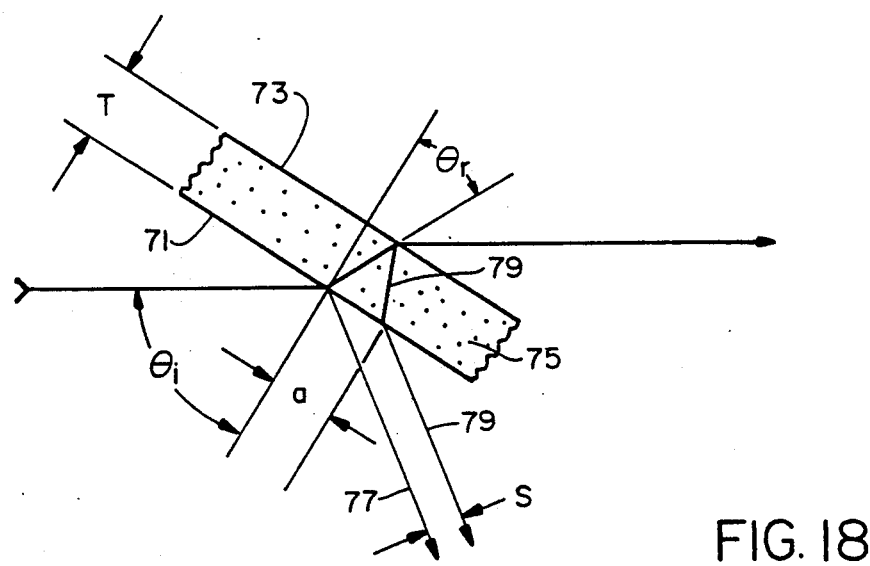
FIG. 18 is a diagram illustrating the mechanism behind the interference effect.

Referring to FIG. 18, there is shown a diagram illustrating the mechanism behind the interference effects. These interference effects can be explained by the interference of two weakly reflected beams 77 and 79 from the sides 71 and 73 of the thin birefringent filter plate 75. Non-zero reflections occur because the filter is not precisely at the angle for minimum reflection, because 17 Brewster's angle depends upon the index of refraction and because there are two different refractive indices for birefringent plate 75 giving no unique Brewster angle for all rays. The rays 77 and 79 comprise two light beams which can interfere with each other if there is any overlap between the beams and the path length difference is a certain amount. As these beams 77 and 79 interfere, the frequency and sometimes the power of the beam oscillating in the dye laser cavity is modulated. Constructive interference occurs if the phase difference between beams 77 and 79 caused by the differences in path length etc. is some even integer multiple of 180°. Destructive interference occurs if the difference in phase is some odd integer multiple of 180°. Tests in the lab show that the shifts in spectral intensity illustrated in FIGS. 12(a)–12(g) do occur when the interference effect is operating. Although the reason is not totally clear, one possible explanation is that because of the principle that energy must be conserved so when destructive interference is occurring, the energy is not lost but is fed back into the cavity. Conversely, when constructive interference is occurring, that energy is lost to the cavity. It is known, however, that the interference effect can be at least partially suppressed using the structure shown in FIG. 19 and explained below.

There follows an analysis of the interference effect. The input beam is at Brewster's angle, $$a = 2T/n \tag{17}$$

so $$S = \frac{2T}{n} \cos\theta_i \tag{18}$$

where S is the spacing between the beams. For T=0.3 mm, S=0.21 mm, which is much smaller than typical dye laser beam sizes. It can further be shown that the optical path length difference between the two reflected beams is $2nT \sin \theta_i$.

Figure 19:
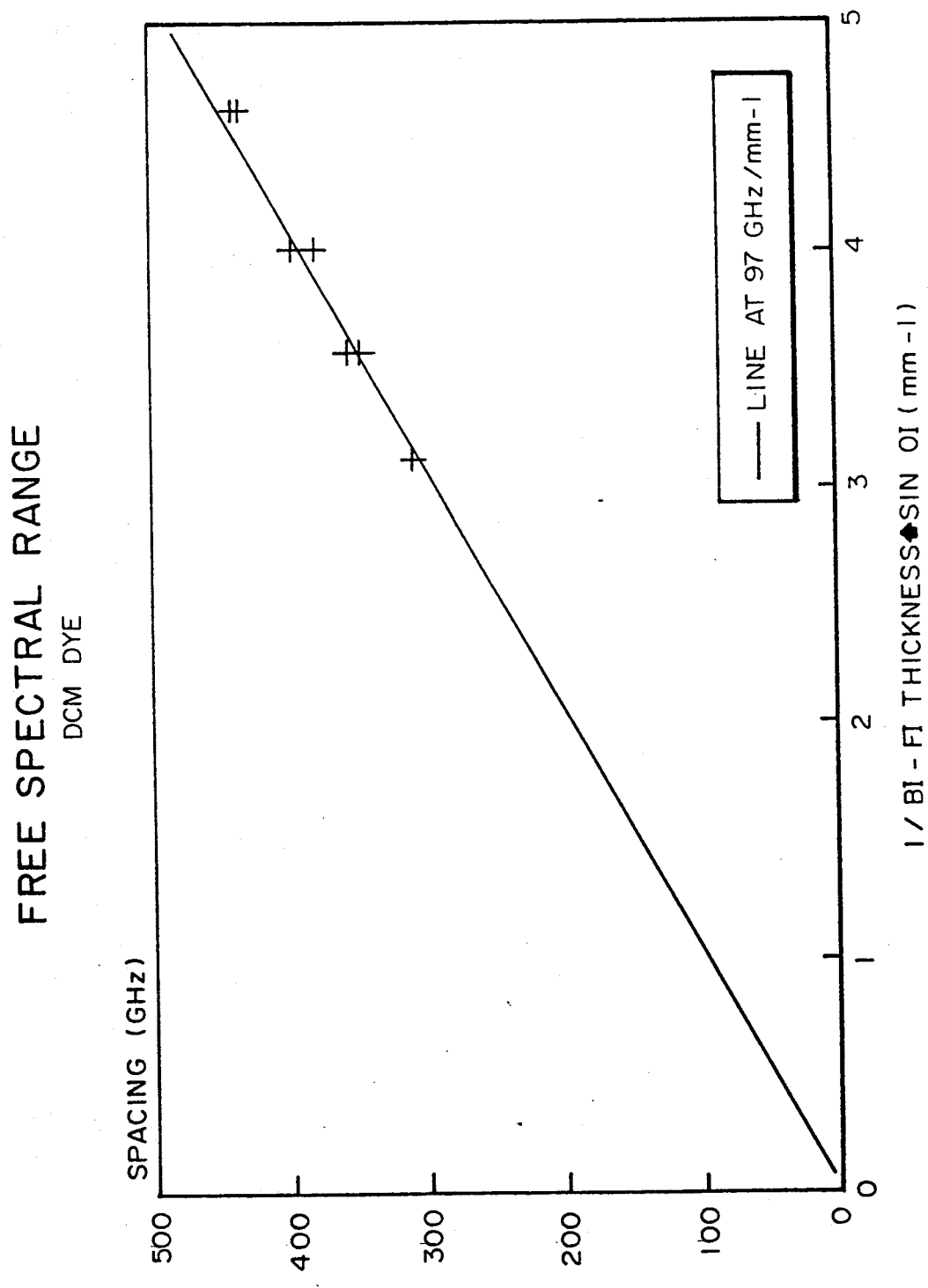
FIG. 19 is a graph of the free spectral range of tuning anomalies in DCM dye.

This source of interference was verified experimentally by measuring the frequency change from one anomaly to the next as a function of plate thickness, e.g., from anomaly 81 to anomaly 83 in FIG. 14. A series of data points taken with DCM dye is plotted in FIG. 19, showing the fringe (anomaly) spacing in GHz vs. the reciprocal of plate thickness times sin $\theta_i$. The straight line is drawn at the theoretical slope value, c/2m=97 GHz/mm-1.

Figure 20:
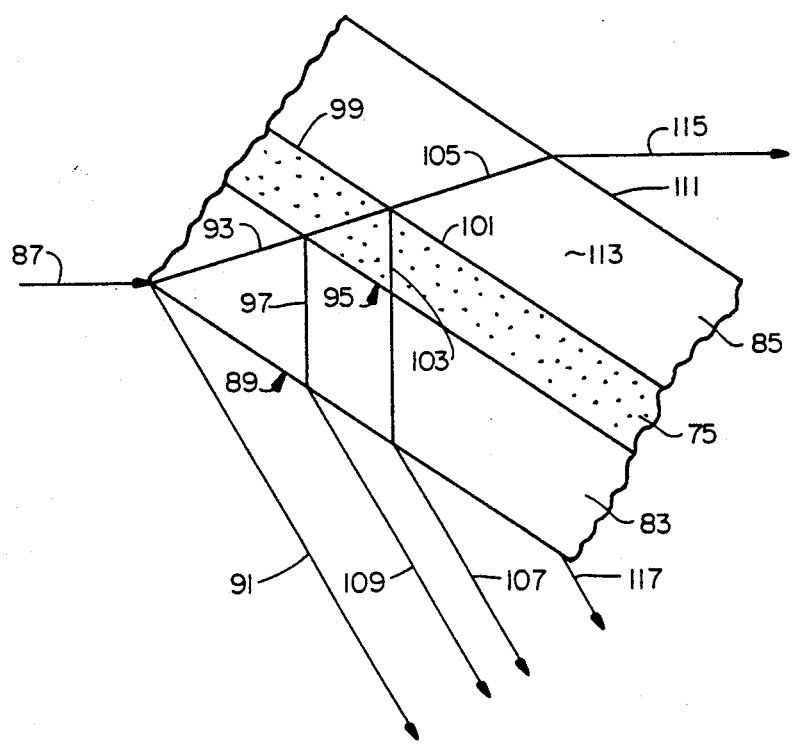
FIG. 20 is a diagram illustrating how the nonbirefringent substrates reduce or eliminate interference.

This interference effect can be partially suppressed by optically contacting the thin birefringent plate to a transparent substrate of the same index of refraction. Such a structure is shown in FIG. 20. A birefringent filter tuning plate 75 is sandwiched between two non-birefringent substrates 83 and 85. The refractive index of the non-birefringent substrates is selected preferably to match the average refractive index of the birefringent plate 75. In alternative embodiments, the index of the substrates 83 and 85 may be selected to match either index of the birefringent plate 75 (or at least some index on either end of the range of indexes of the birefringent plate 75.

An incident ray 87 strikes the surface 89 of the substrate 83 and is partially reflected as ray 91 and partially refracted as ray 93. Ray 93 strikes the interface 95 between the substrate 83 and the birefringent plate 75. There it is partially reflected as ray 97 and partially transmitted as ray 99. Little, if any, refraction occurs at the interface 95 because of the substantial index match. Also, little reflection as ray 97 occurs for the same reason. Reflected power from an interface between two different media is greater when there is an index mismatch between the media.

The ray 99 continues through the plate 75 until it reaches the interface 101 between the plate 75 and the substrate 85. Again, at interface 101, there is a slight reflection as ray 103 and most of the power in ray 99 continues as ray 105. The ray 103 continues through the plate 75 and the substrate 83 until it reaches the surface 89. There, ray 103 is refracted as ray 107. Likewise, reflected ray 97 is refracted at surface 89 as the ray 109. When the ray 105 reaches the surface 111, it is partially reflected as ray 113 and partially transmitted as ray 115. The ray 113 continues through the substrate 85, the plate 75 and the substrate 83 until it reaches the surface 89. There, it is refracted as ray 117.

Because of the index match between substrates 83, 85 and plate 75, the reflected power in rays 107 and 109 is substantially less than the reflected power in rays 77, 79 of FIG. 18. Most of the reflected power in the structure of FIG. 20 is in rays 91 and 117. The power in rays 107 and 109 is reduced relative to the power in rays 77 and 79 of FIG. 18 because of the index matching between the substrates 83, 85 and the plate 75. Because of the presence of the substrates 83 and 85, and the greater separation between the 89 and 111 versus the surfaces 71 and 73 in the structure shown in FIG. 18, the rays 91 and 117 are too far apart to interfere with each other. The rays 107 and 109 are still close enough together to interfere. But since most of the reflected power is in rays 91 and 117, which do not interfere, the interference effect is suppressed.

We desire now to find a suitable material for the substrates 83 and 85. Since the reflected power near Brewster's angle (p-polarization) is less than 0.001%, we desire an index match between the birefringent plate 75 and some substrate 83, 85 made of a material yet to be determined such that the reflection at the interfaces 95 and 101 is less than a tenth of that. Let $\Delta n$ be the index difference between crystal quartz of the birefringent plate 75 and a glass to be determined for the substrates 83, 85.

To find an approximate relation between reflectivity and $\Delta n$, recall that from Jenkins and White, *Fundamentals of Optics*, 4th ed. (McGraw-Hill, N.Y. 1976), Chap. 25:

$$r_p = \left[ \frac{\tan(\theta_r - \theta'_r)}{\tan(\theta_r + \theta'_r)} \right]^2 \tag{19}$$

Assume $\theta_r + \theta'_r = 2\theta_r$ and $\theta'_r = \theta_r + \Delta\theta_r$ (20, 21)

Where $\theta_r$ is the angle of a ray in medium n, and $\theta'_r$ is the angle of a ray in medium n'.
In this case, $$\frac{\sin\theta'_r}{\sin\theta_r} = 1 + n\Delta\theta_r \tag{22}$$

Using Snell's Law and trigonometric relations, one finds at Brewster's angle that $$\Delta\theta_r = \frac{\Delta n}{n^2} \tag{23}$$

So, $$r_p = \left[ \frac{-\Delta n}{n^2 \tan 2\theta_r} \right]^2 \tag{24}$$

For crystal quartz, n−1.55, and $\theta_r$=32.8°, so $$r_p = \frac{(\Delta n)^2}{28} \tag{25}$$

To get $r_p < 10^{-6}$, then $\Delta n$ must be $< 5.3 \times 10^{-3}$.

Glass KZF1 has an index of refraction very near $n_e$ for crystal quartz ($\Delta_n$ from +0.002 to −0.004) and pretty close to $n_o$. ($\Delta n$ from 0.012 to 0.004.) Some other glasses are slightly closer to the desired index but have other undesirable properties such as poor transmission or staining. The proposed design solution then is to make an optical contact between the thinnest birefringent plate and a 1.0 to 1.5 mm thick piece of KZF1 glass.

Tests of this design approach showed a distinct improvement in tuning smoothness, even in 1-plate filters, where fluctuations are most pronounced.

Interference effects are most pronounced in 1-plate filters because there are no other plates to create additional losses to block "frequency pulling". Frequency pulling and power losses are what cause the distortion seen in FIG. 12(d) of the spectral power distribution.

Frequency pulling is a phenomenon where the laser shifts its lasing frequency slightly to the left or right of a frequency where losses caused by the interference effect are occurring. To the extent that this phenomena is understood, the applicants believe that power losses from the cavity caused by constructive interference result in the dip in spectral power shown at 121 in FIG. 12(d). These losses tend to cause lasing of greater intensity at the wavelengths corresponding to the peaks at 123 and 125 because of the natural tendency of the laser to lase more intensely and shift frequency to frequencies where higher gain occurs. In multiple birefringent plate filters, extra losses are imposed by the additional plates at the off-peak wavelengths, corresponding to the peaks 123 and 125. In these multiple plate tuning filter lasers, the interference effect manifests itself as a modulation in power. In one plate lasers, the interference effect tends more to result in modulation of the frequency of lasing by "frequency pulling".

Figure 21:
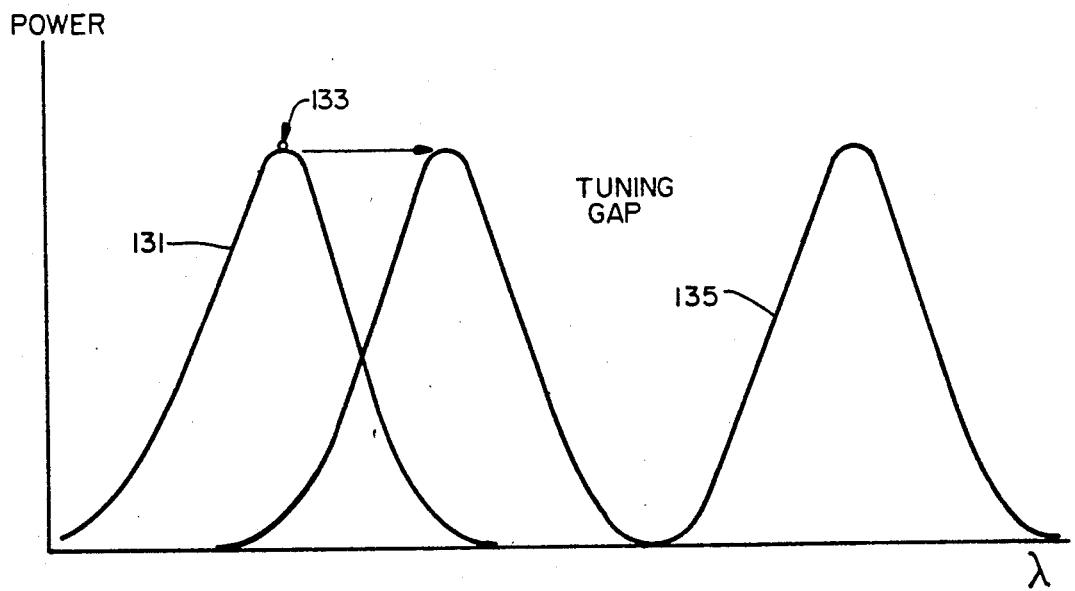
FIG. 21 is an illustration of the effect of interference in creating a tuning gap.

Referring to FIG. 21, there is shown an illustration of how the interference effect can result in a tuning gap. The tuning gap in FIG. 21 represents a wavelength or band of wavelengths where the laser will not lase. To illustrate, assume that the tuning angle is set at some value which results in the spectral power distribution at 131. As the tuning angle is changed, the spectral power distribution curve shifts slowly to the right. At wavelengths where constructive interference is occurring, power is lost from the cavity while at wavelengths where destructive interference is occurring no power is lost. As a result, as the tuning angle is changed, the spectral power distribution curve shifts to the right gradually, but the peak power changes sinusoidally. That is, the power represented by the peak at 133 traces out a sinusoidal locus like that shown in FIG. 14 as the spectral intensity curve shifts to the right.

In some circumstances, the losses from the interference effect can be large enough that the laser will be extinguished at a certain wavelength or band of wavelengths. This causes the tuning gap shown in FIG. 21. When the tuning angle is changed sufficiently that the path length difference and phase difference are such that losses caused by the interference effect are not large enough to cause the laser to be extinguished lasing once again starts as shown by the spectral power distribution curve at 135.

Off-Order Results

One often observes wavelengths not predicted by these equations, particularly when pumped well above threshold. One of the more common situations is to find points half way between tuning curves, when the wavelengths are near the extremes of the dye tuning range. Such off order results are shown at 137 and 139 in FIGS. 7 and 8, respectively. These data correspond to half-wave solutions (instead of full wave) which have sufficient gain to get over threshold in spite of the additional loss at one surface of the birefringent plate. This correspondence has been confirmed in single plate filters by noting the change of polarization with tuning angle. Sometimes these half-order outputs can be suppressed by inserting a Brewster plate between the filter and the output controller.

Specific Example

Design a Bi-Refringent Filter for a CW Ti:Sapphire Laser, Operating from 700 nm to 1000 nm.

Figure 22:
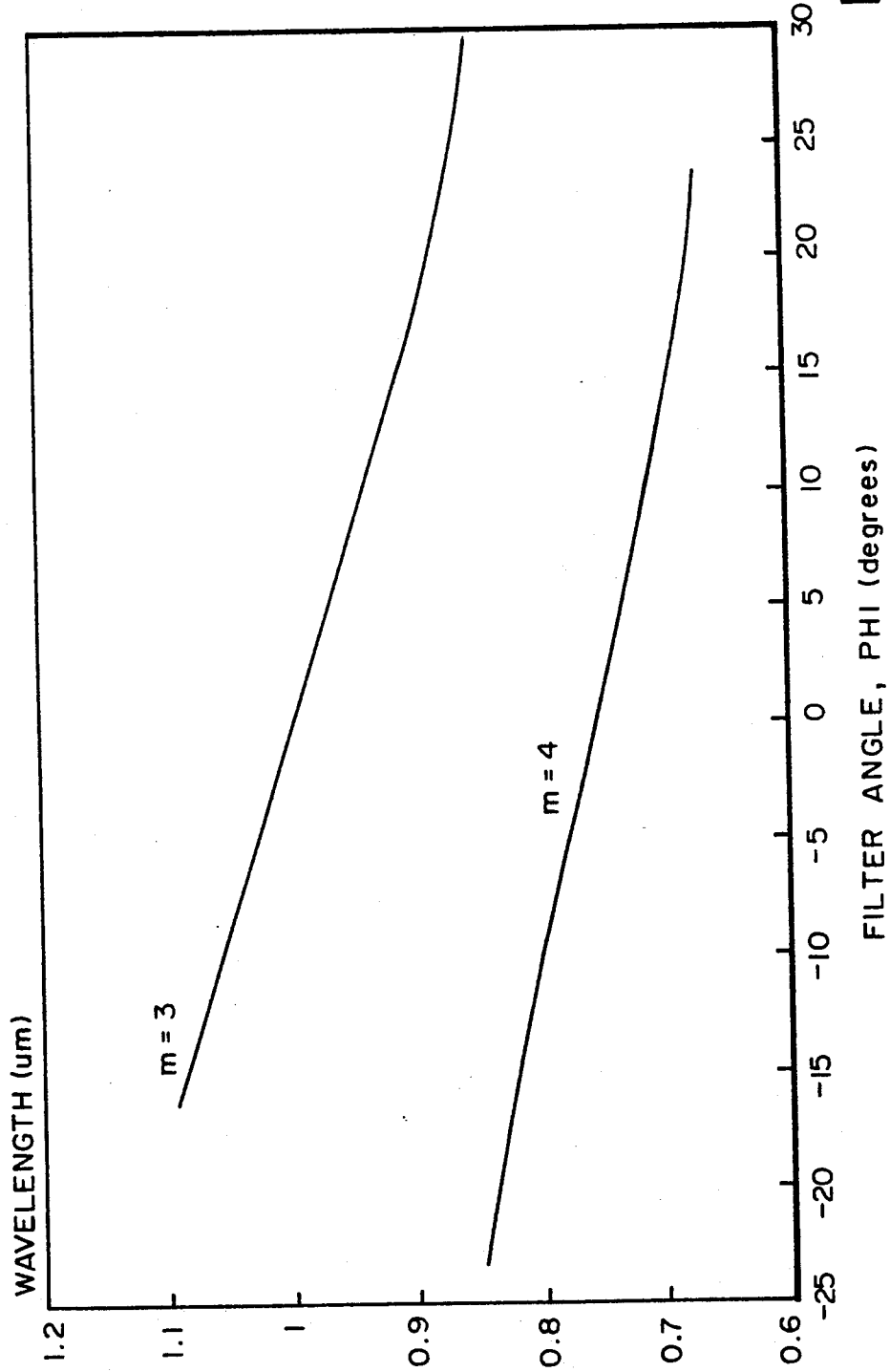
FIG. 22 is another set of tuning curves for T=0.335 mm.

No single tuning curve with adequate wavelength sensitivity, low loss for typical plate thickness errors, and good modulation depth over the entire wavelength range has been found to date. Since the high reflective mirrors had to be separated into two ranges, it would be adequate to find a tuning element solution using two orders, each of which corresponded to one of the mirror coating ranges: 700–850 nm, and 850–1000 nm. A good balance was found using a thin plate thickness of 0.335 mm. FIG. 22 is a graphical presentation of 2 tuning curves for orders 3 and 4 for a Ti:Sapphire laser with a thin plate thickness of 0.335 nm. Notice in FIG. 22 that there is room on both order curves to extend the wavelength range past the nominal 700–1000 nm range.

With a Ti:Sapphire lasing medium, the gain is lower than in dye lasers, and the allowed single pass loss is about ¼ that in dye lasers. So $\Delta I = 0.0025$, and $$\Delta \lambda = \frac{.05\lambda}{\pi m} \tag{26}$$

The most sensitive area is the shortest wavelength. In this case that is 700 nm, and the order number is 4. For the second plate, ($p_2 = 4$), $$\Delta \lambda = 0.70 \text{ nm} \tag{27}$$

and for the third plate, ($p_3 = 16$), $$\Delta \lambda = 0.17 \text{ nm} \tag{28}$$

These tolerances on wavelength error and the requirement to tune over a wider angular range lead to a thickness tolerance of 3 μm, which is quite tight, but achievable. The optic axis tolerance was found to be very important, and FIG. 19 shows that the optic axis must be the same on each plate to no more than 5' of arc.

The increased sensitivity to losses gives improved linewidth (with respect to dye lasers) from a 3-plate filter, but also made it imperative to suppress the interference effects in the thin plate. Interference effects in solid state lasers are made even worse than in dye lasers because the beam impinging the birefringent filter is of larger diameter thereby creating greater overlap between the rays 77 and 79 in FIG. 18. The optically contacted substrates 83 and 85 were employed, and it has been found that tuning is exceptionally smooth.

The laser shown in FIG. 4 is comprised of the same elements as are found in the prior art, except that several key differences exist. The first of these differences is that the thickness of the first birefringent tuning plate 60 has been selected in accordance with the tuning equation given above as equation (8) so as to satisfy certain requirements. Those requirements will be described in more detail below. The equation of FIG. 5 represents a relationship which has been discovered by the applicant but which can be derived from the Lovold et al. reference. This tuning relationship is not found in any of the prior art work cited herein, and is not believed to be known in the prior art The tuning relationships given in some of the prior art cited herein seem to be incorrect and not verifiable by experimental data. The tuning relationship shown in equation (8) has been verified from the violet to infrared by experimental data.

The structure shown in FIG. 4 also differs from prior art lasers in the use of a tuning anomaly suppressor 62 in the form of a glass plate oriented at Brewster's angle to the beam resonating in the cavity. The purpose and function of this device 62 will be explained in more detail below.

The requirements mentioned above used to select the thickness of the first birefringent plate will now be discussed. Heretofore, the relationship between the wavelength which will be selected for lasing at any particular angle of the birefringent tuning plates, and all the other measurable factors on the right side of equation (8) has not been understood. The relationship expressed in equation (8) represents a major step forward in the sense that now the thickness of the first birefringent tuning plate 60 may be chosen as a matter of design criteria to achieve certain desirable characteristics of laser operation. In the past, the relationship of the selected wavelength to the thickness of the first birefringent plate was not mathematically known. This is because these two quantities were related by a complex relationship which included certain factors which were not measurable. As a result, prior art tuning equations were theoretically useful only and could not be used for purposes of designing a better laser. Equation (8) represents the first known equation mathematically relating the thickness of the first birefringent tuning plate to the wavelength of lasing activity in terms of measurable factors.

Figure 23:
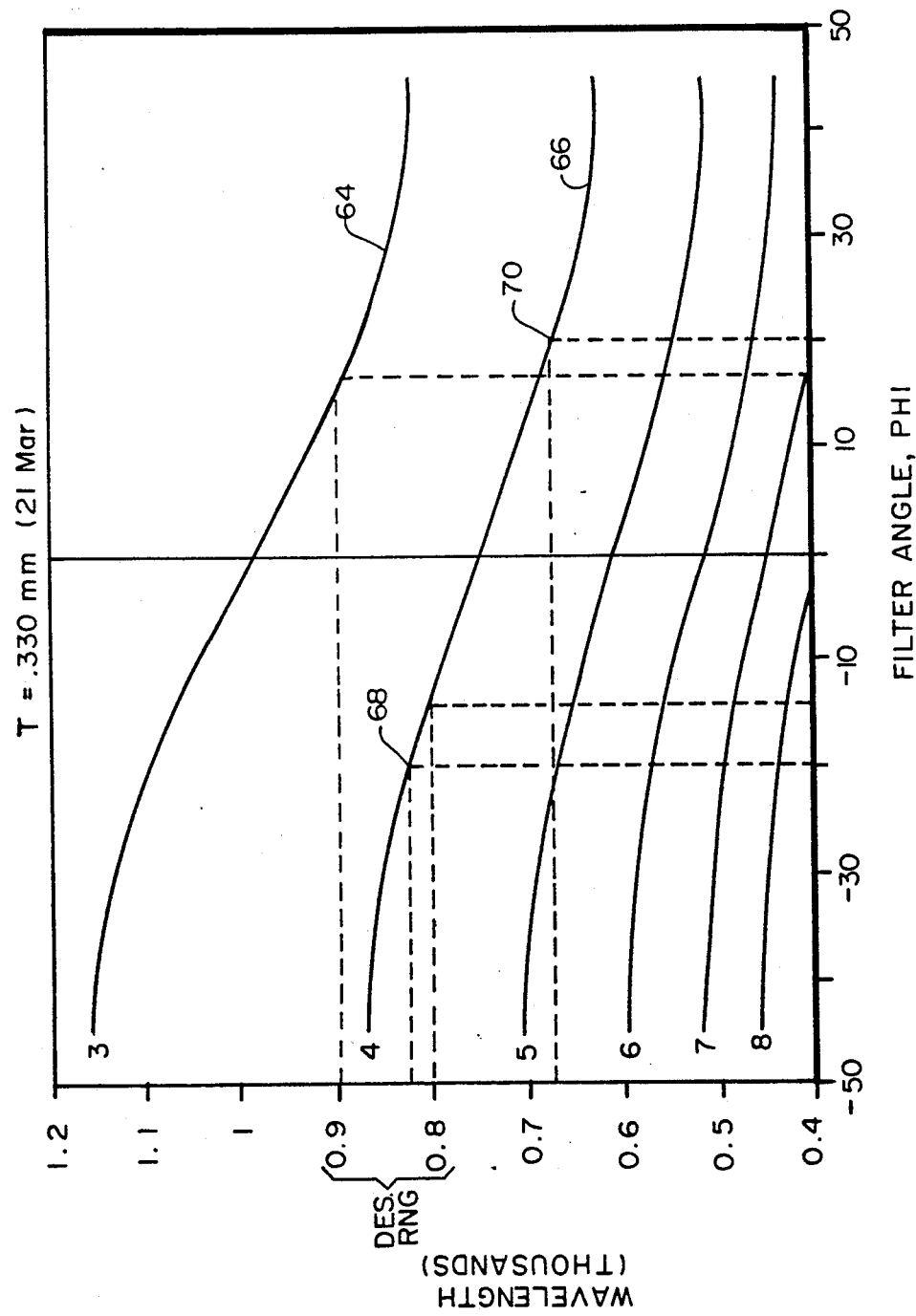
FIG. 23 is a set of tuning curves for T=0.33 mm.

The utility of tuning equation (8) can be most easily appreciated by reference to FIG. 23, which shows a set of tuning curves for a birefringent tuning plate set with the first plate having a thickness of 0.33 mm. This is a very common thickness for prior art dye lasers. In FIG. 23, each curve represents the relationship between tuning angle and frequency, i.e., wavelength, of zero loss for transmission through the birefringent tuning plate (thickness of 0.33 mm). The numbers written to the left of each curve represent the order number in the sense of the number of full wavelengths of phase retardation during travel through the birefringent plate. For example, the curve 64 represents the third order tuning curve wherein m in equation (8) is 3 and the phase retardation between the ordinary ray and the extraordinary ray amounts to three full wavelengths. Likewise, the curve 66 is the fourth order curve wherein the phase retardation is equal to four full wavelengths.

One tuning range of interest in a dye laser is between 0.8 microns and 0.9 microns in wavelength. Wavelengths within this range are selected by altering the filter tuning angle, $\phi$. This causes the wavelengths of zero loss to be altered such that the wavelength of lasing activity is changed. For example, if the filter angle is varied between $-15$ degrees and $+15$ degrees, the wavelength of lasing will be altered along the fourth order tuning curve between the points 68 and 70.

As can be seen from inspection of FIG. 23, even if the tuning angle were changed to $-50$ degrees, the wavelength of minimum loss would never reach 0.9 microns. To cause the laser to lase at this wavelength, it would be necessary to switch tuning curves to the third order curve 64. This would mean that the filter angle would have to be varied from approximately $-14$ degrees to select 0.8 microns on the fourth order tuning curve to approximately $+18$ degrees on the third order tuning curve to select wavelengths of approximately 0.9 microns. The difficulty with this approach is that it requires high tuning angles on the fourth order curve to select wavelengths in the bottom half of the range from 0.8 to 0.9 microns, and then it requires a large change in angle to 17 to 18 positive degrees to switch to the third order tuning curve to select wavelengths in the upper half of the desired tuning range. This is both inconvenient and causes certain errors.

It has been noted by workers in the art that certain errors are caused or aggravated at high tuning angles. Thus, when the tuning angle is between 30 and 50 degrees on the fourth order tuning curve, these errors begin to occur.

Such errors include lasing at sideband frequencies or jumping suddenly to a lower order tuning. As to this latter phenomenon, it has been noted by workers in the prior art that when dye lasers having tuning curves similar to that shown in FIG. 23 are pumped hard and are tuned to near the ends of the tuning range on any particular order curve, there frequently occurs a jump in the lasing frequency to a frequency closer to the center of the desired tuning range. The reason that this jump occurs is that there is more system gain near the band center even with polarization losses, than exists near the dye range edges even with p-polarization. However, this jump in lasing frequency is known to be undesirable since users of such lasers prefer substantially linear and smooth tuning throughout the tuning range with no sudden jumps in the frequency, i.e., color of the output light. Therefore, it would be preferable to have a structure wherein the lasing action ceases prior to the occurrence of such a jump.

To eliminate all of these problems, a structure for a dye laser according to the teachings of the invention and as shown in FIG. 4 has been found. The thickness of the thinnest birefringent tuning plate 60 is selected in accordance with tuning equation (8) to provide several beneficial effects. The polarizing element 62 is also provided to eliminate the phenomenon of jumping from frequencies near the end of a tuning curve back toward a frequency where the gain level is higher near the center of the tuning curve. The polarizer 62 is at Brewster's angle like all the birefringent tuning plates and serves this purpose by causing additional losses to result when the jump occurs. These losses may be sufficient to extinguish the laser. If not, additional polarizers can be used. The applicant has discovered that when such jumps in lasing frequency occur, not only does the wavelength change, but the polarization angle changes as well. Polarizer 62 is oriented such that only light having the polarization angle at the wavelength selected by the birefringent tuning plates can pass through the polarizer 62 without substantial losses. Light having any other polarization angle will suffer considerable losses during transmission through the polarizer 62. Because the polarization angle changes to a substantially different value when the undesired jump near the end of the tuning curve occurs, the polarizer 62 imposes sufficient additional losses to extinguish lasing action.

The effect of the polarizer plate 62 occurs independently and separately from the benefits of proper selection of the thickness of the birefringent tuning element 60. Therefore, the polarizer element 62 can be used in a prior art laser to provide a separate and independent improvement in the operation of such a laser. That is, its effect will occur regardless of the thickness of the birefringent tuning element 60.

Figure 24:
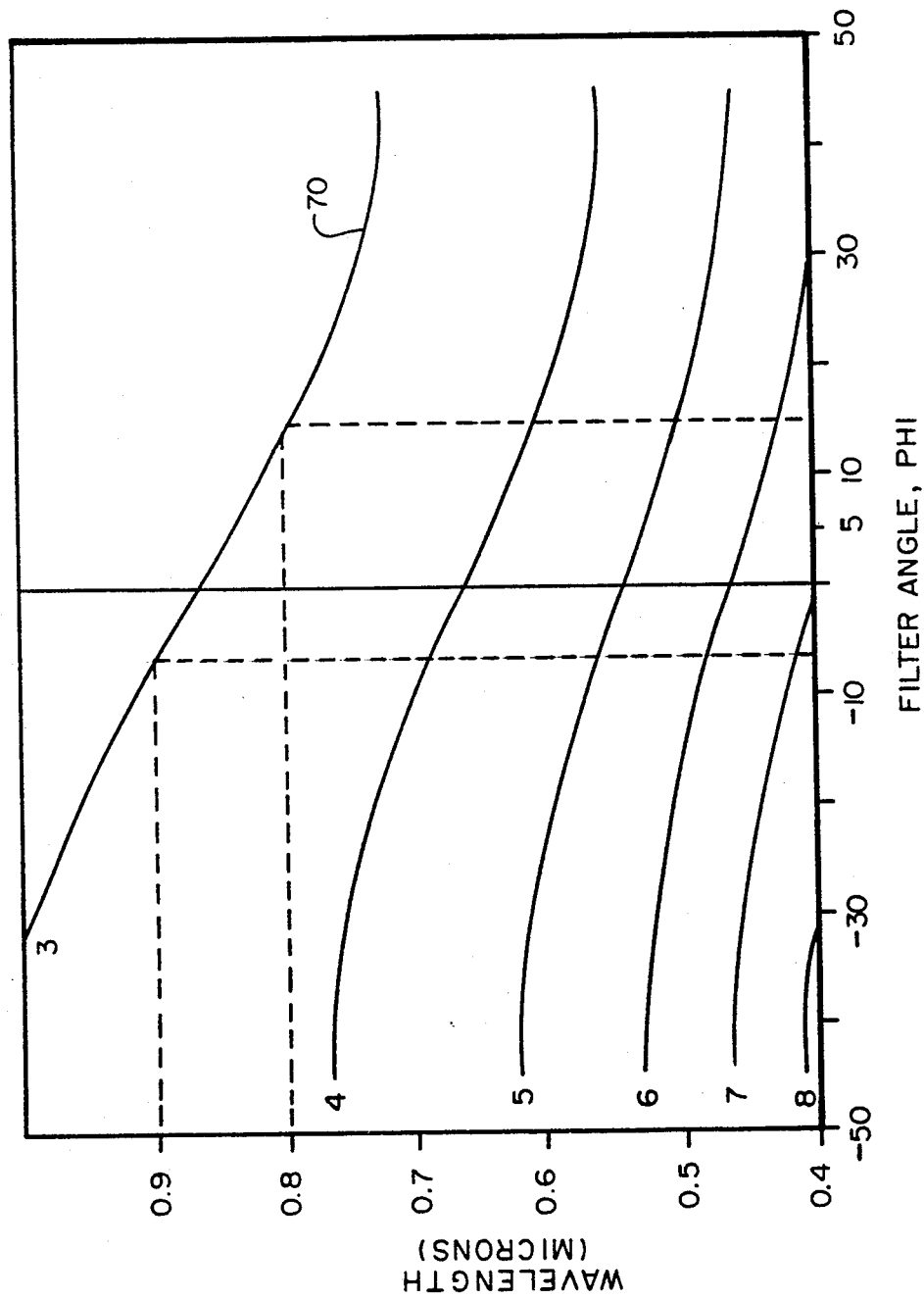
FIG. 24 is a set of tuning curves for T=0.29 mm.

The thickness of the birefringent tuning plate 60 is selected in accordance with tuning equation (8) such that the tuning curves shown in FIG. 24 result. An improved laser will result using the thickness for the birefringent tuning element 60 given in FIG. 24 (0.29 mm) even if the polarizing element 62 is not present. The presence of the polarizing element 62 adds the additional benefit of suppressing the tuning anomalies which can occur near the end of the tuning range. Such tuning anomalies are also referred to as "off-order" solutions and are graphically shown as the wavelengths of lasing shown at points 137, and 139 in FIGS. 7 and 8.

In FIG. 24, the tuning curves for a first birefringent plate thickness of 0.29 mm are shown. Note that the third order tuning curve 70 covers the entire desired tuning range from 0.8 to 0.9 microns in a relatively linear fashion such that equal displacements of filter tuning angle result in approximately equal displacements of the selected wavelength of lasing. Note also that the tuning range is centered on a filter angle of approximately 5 degrees.

The thickness of the first plate was chosen such that a single order curve would cover the entire dye's lasing wavelength range and be centered on approximately 5 degrees for the following reason. During the manufacture of the birefringent tuning plates, thickness can be easily controlled to within only plus or minus 3 microns with current production technology. Thus, divergence of the thickness of the second and third birefringent tuning plates away from exact integer thickness multiples of the thickness of the thinnest birefringent tuning plate causes losses. A thickness error in the first and thinnest tuning plate only changes the center frequency of the tuning range.

Acceptable limits for losses caused by thickness errors in the thicknesses of the second and third tuning plates are losses in a single pass of 0.5% or less. An acceptable range of single pass losses caused by thickness errors would be from 1% to 0.1% depending upon the application. Thickness tolerances of plus or minus 5 microns will hold losses within an acceptable range. Tighter tolerance can be achieved, but they are more expensive to attain.

Lack of parallelism between the tuning plates also causes losses so mounting the plates to be parallel is important to suppress these losses. Acceptable tolerances for parallelism are approximately 5 to 6 minutes for the third plate and 5 to 24 minutes for the second plate. It is desirable to hold the losses caused by lack of parallelism to the same range as losses caused by thickness errors. If the above cited parallelism tolerances are maintained, the losses created by the lack of exact parallelism will be no greater than one half the losses created by the thickness errors if these thickness errors are within the tolerance mentioned above.

Also, it is desirable to have approximately linear tuning without excessive sensitivity and easy alignment. Sensitivity to thickness errors is less in linear regions of the tuning curves. Before the concept of linear tuning can be understood, the meaning of the terms sensitivity and alignment should be understood.

Sensitivity means that the tuning curve should have a slope which results in a relatively gradual change of the selected wavelength for a relatively gradual change of the filter angle. In other words, if very small changes in the filter angle result in very large changes in the wavelength, then the tuning will be too sensitive to achieve very fine resolution of the wavelength of lasing. The structure suggested by the Lovold et al. reference with the optic axis out of the plane of the birefringent tuning plate has the characteristic that the wavelength of lasing is ten times as sensitive to changes in the tuning angle, $\phi$ where the optic axis is at 45 degrees as when the optic axis is in the plane of the tuning plate. The slope of the tuning curve determines sensitivity and is not very dependent on thickness.

Figure 25:
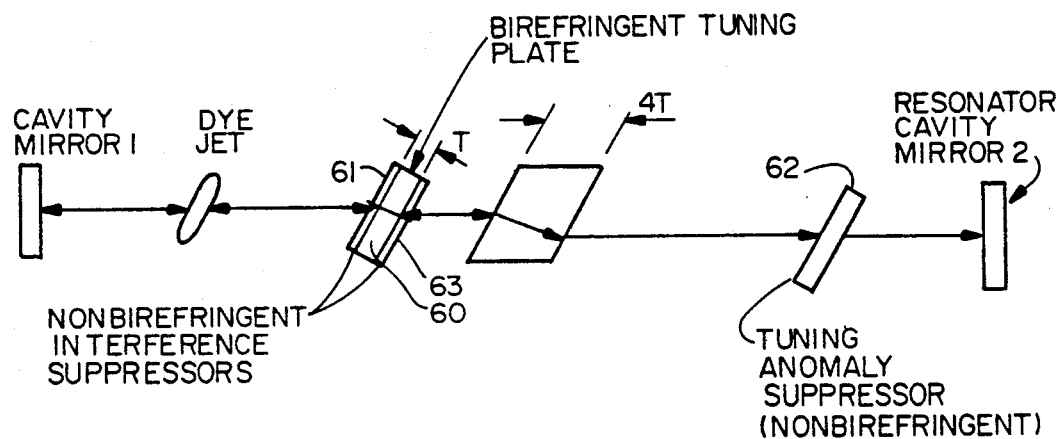
FIG. 25 is a two plate dye laser with interference effect and tuning anomaly suppressor.
Figure 26:
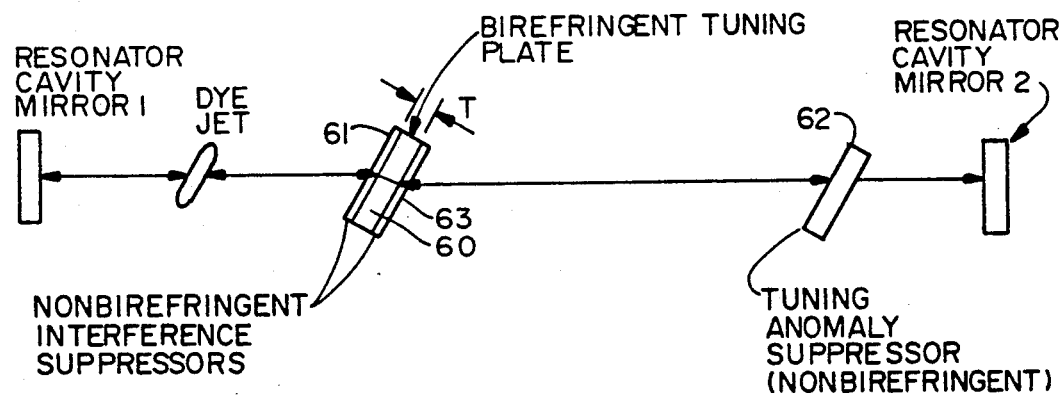
FIG. 26 is a one filter tuning plate dye laser with interference effect suppressor and a tuning anomaly suppressor plate.
Figure 27:
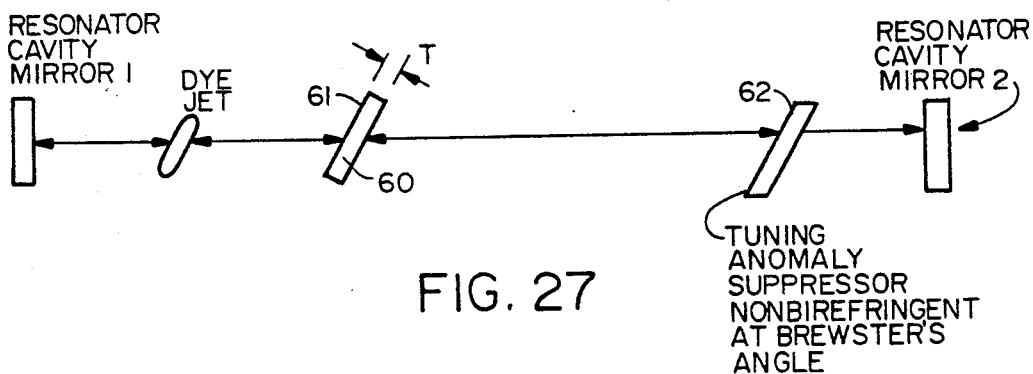
FIG. 27 is a one tuning plate dye laser with a tuning anomaly suppressor and no interference effect suppression.
Figure 28:
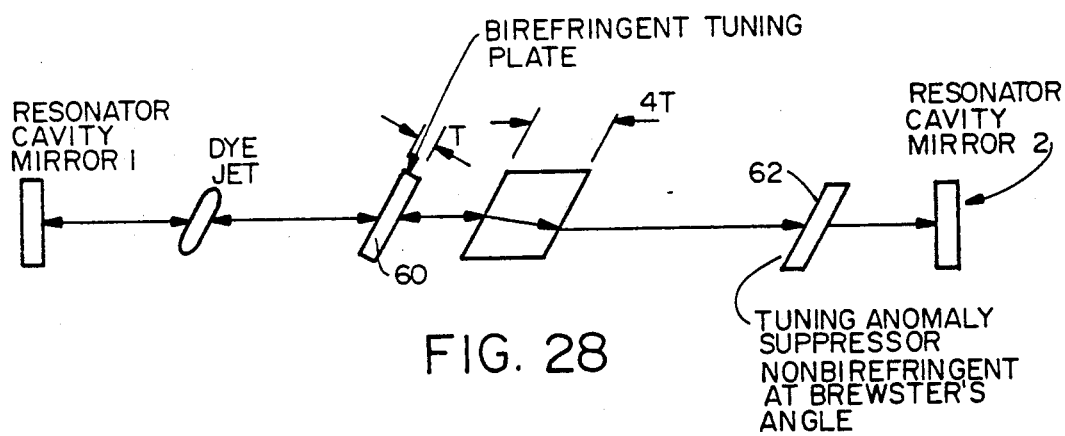
FIG. 28 is a two plate laser without interference effect suppression and with a tuning anomaly suppressor.

Another consideration related to sensitivity is the smoothness or discontinuity of the tuning function. Tuning discontinuities can result because of interference effects as described above. These interference effects are readily apparent in 1-plate filters in the thickness range from 0.26 to 0.38 mm, with the effect becoming more pronounced as the thickness of the plate decreases. The interference effects are also apparent in 2-plate filters, but are not as apparent in 3-plate filters because of the additional restrictions on the allowable lasing frequency imposed by losses in the second and third plates. These interference effects cause discontinuities in the tuning of the laser such that the wavelength of lasing can jump by as much as 1 nm. As noted above, interference effects can be suppressed by optically contacting the thin birefringent plates with glass substrates of approximately the same index of refraction. FIG. 4 includes these glass substrates in optical contact with the thinnest birefringent plate 60 in the form of two layers 61 and 63 of index matched nonbirefringent glass formed on the surfaces of the plate 60. The layers 61 and 63 are preferably KZF1 glass of a thickness from 0.5 to 2.0 mm with 1.0 to 1.4 mm being typical. The layers 61 and 63 are optional for the three plate embodiment shown in FIG. 4. There is no need for optical contacting substrates on the second and third plates 72 and 74 since these plates are too thick to cause the interference effect since no overlap in the reflected beams will occur. 1-plate and 2-plate dye lasers having nonbirefringent plates in optical contact with the thinnest plate are shown in FIGS. 25 and 26. FIGS. 27 and 28 show 1-plate and 2-plate dye lasers having nonbirefringent plates in the cavity at Brewster's angle to suppress tuning anomalies where the interference fringe suppressors in the form of nonbirefringent plates in optical contact with the thinnest tuning plate 60 are omitted.

All the structure and function of the various elements in FIGS. 25, 26. 27 and 28 are the same as previously explained for the embodiment shown in FIG. 4 except that the extra birefringent tuning plates are not present, so the peak transmission factor of the transmission factor versus wavelength curve (see FIG. 2) will occur over a broader range of wavelengths. Note that the nonbirefringent layers of index matched glass for interference fringe suppression in FIGS. 25 and 26 may be placed on only one surface of the thinnest birefringent plate in all the embodiments of FIGS. 4, 25 and 26 but preferably are placed on both surfaces.

Figure 29:
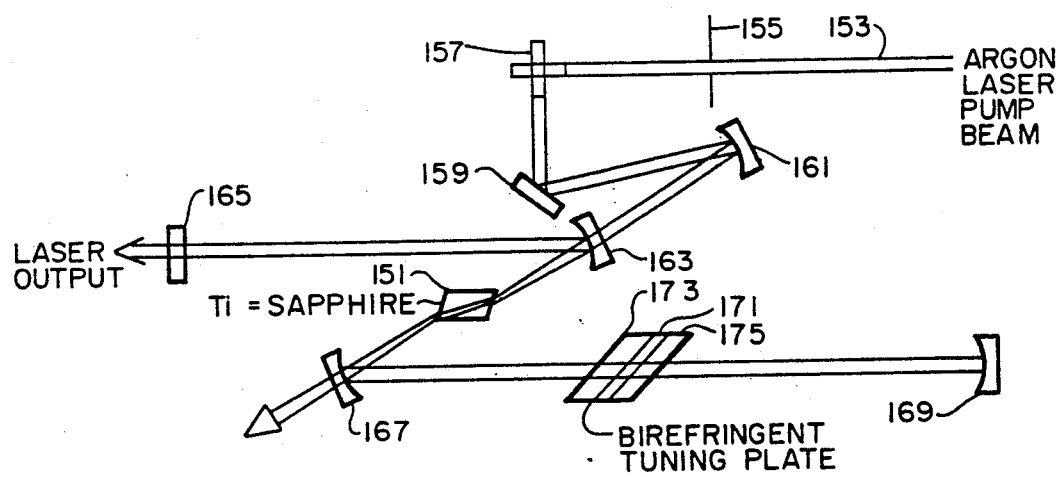
FIG. 29 is a solid state laser with a one plate tuning filter with interference effect suppression.

FIG. 29 shows a solid state Ti:Sapphire laser employing a single plate birefringent tuning filter. Additional birefringent tuning plates may be added as in the case of dye lasers. The solid state lasing medium is shown at 151. Pump energy in a beam 153 from an external argon laser passes through an input alignment aperture and a polarization rotator 157 to reach a flat mirror 159. There the pump energy is reflected to a pump focus mirror 161 where it is focused through the back side of a cavity resonator mirror 163 onto the titanium:sapphire lasing medium 151. The lasing medium then lases and light from this lasing activity resonates in the laser cavity resonator comprised of mirrors 165, 167, 169 and 163. The resonating light passes through a birefringent tuning plate 171 and two nonbirefringent, index-matched, optically contacted substrates 173 and 175. These substrates 173 and 175 operate to suppress interference effects in the same manner as described above.

Figure 30:
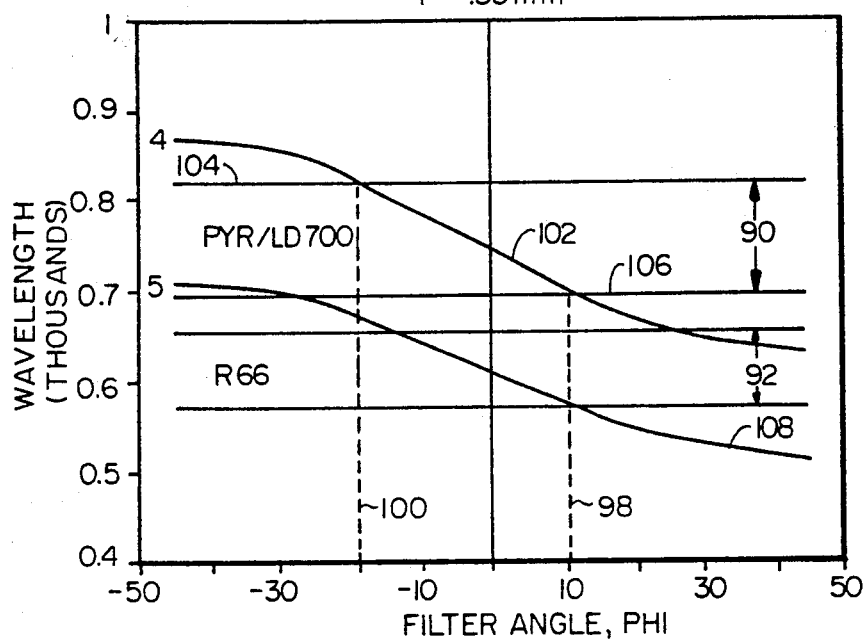
FIGS. 30 and 31 illustrate the concept of Free Spectral Range.
Figure 31:
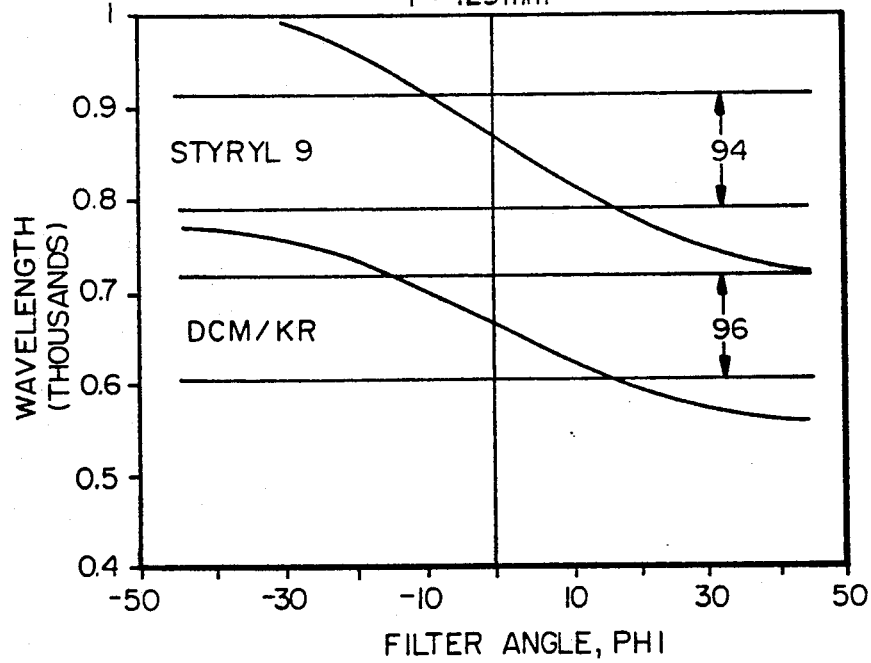

Another important design criteria controlling the exact dimensions which should be picked from the infinite number of combinations of structural elements from which a dye laser may be constructed is the Free Spectral Range. The Free Spectral Range is the wavelength difference between the tuning curves of different orders. It is important that the Free Spectral Range be large enough that there be no overlap between different order curves in the range of tuning angles, $\phi$, encompassed by the intersection between the selected order tuning curve upon which operation is desired and the gain profile for the dye being used in the laser. This can be understood by reference to FIGS. 30 and 31. Gain profiles 90, 92, 94 and 96 represent the bands of wavelengths wherein lasing activity can occur in the four dyes identified there. The dashed lines 98 and 100 in FIG. 30 represent the extent of the effective tuning angles that will change the lasing wavelength on tuning curve 102. This curve is the fourth order solution for the dye PYR/ L0700 having gain profile 90. In other words, with this dye and operating on the fourth order tuning curve 102, the wavelength of lasing can be altered between the wavelength at the line 104 for the tuning angle at line 100 and the wavelength at line 106 for the tuning angle at line 98.

Note that the fifth order solution tuning curve 108 does not intersect the gain profile 90 anywhere inside the range of tuning angles between the lines 98 and 100. If the Free Spectral Range were smaller, the fifth order solution tuning curve 108 would be closer to the fourth order solution tuning curve 102. If the Free Spectral Range is small enough that this "overlap" occurs,.lasing activity could jump from lasing at one wavelength corresponding to the current tuning angle on one tuning curve to the wavelength corresponding to the same tuning angle on another tuning curve. This jump will occur if the other tuning curve has higher gain. Such a jump results in a discontinuity in the wavelength of lasing. By properly selecting the thickness of the first plate 60 to be thinner than is used in the prior art it is possible to remove any overlap by increasing the Free Spectral Range (FSR).

Ease of alignment of the tuning plates is important. This is an additional beneficial effect of the thickness chosen according to the teachings of the invention for the first tuning plate. Alignment in a multiple tuning plate dye laser is needed because of the changes in lasing wavelength which occur because of the losses caused by the introduction to the laser cavity of additional tuning plates which are not perfect integer multiples of the thickness of the first plate and which are not perfectly parallel to the first plate. These losses can shift the wavelength of lasing.

The process of alignment involves rotating the second plate relative to the first plate until the wavelength of lasing is the same as it was before introduction of the second plate. This immediately raises the question as to what wavelength to choose as the "original" wavelength to align against. In other words at what angle does one set the tuning angle of the first tuning plate to establish the wavelength which will serve as the reference wavelength during the alignment process. In the prior art, this wavelength was chosen to be whatever wavelength resulted when the tuning angle was set at zero, i.e., the middle of the tuning range. It has been discovered by the applicant that this is not the best tuning angle to use to establish the reference wavelength. The best angle to use for the tuning angle is approximately $-8$ degrees or $+18$ degrees depending upon the desired range of lasing wavelengths. The second and third plates are then individually rotated until the wavelength of lasing is again the wavelength that resulted with only the thinnest tuning plate present with the tuning angle set at either $-8$ or $+18$ degrees.

Figure 32:
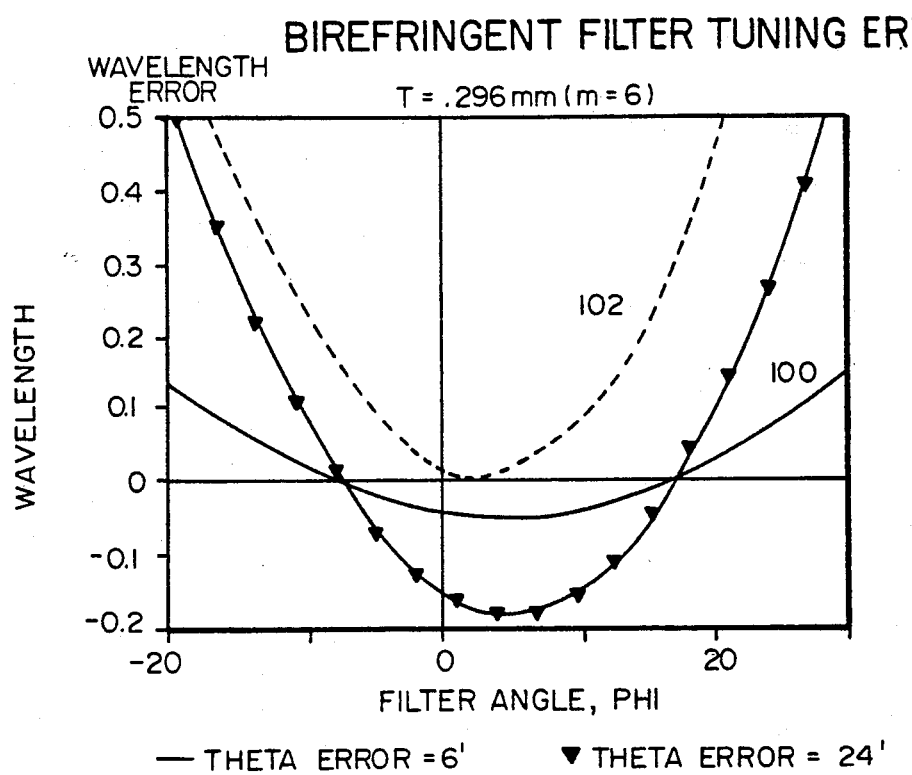
FIGS. 32 and 33 illustrate filter tuning error for various error types in the birefringent filter.
Figure 33:
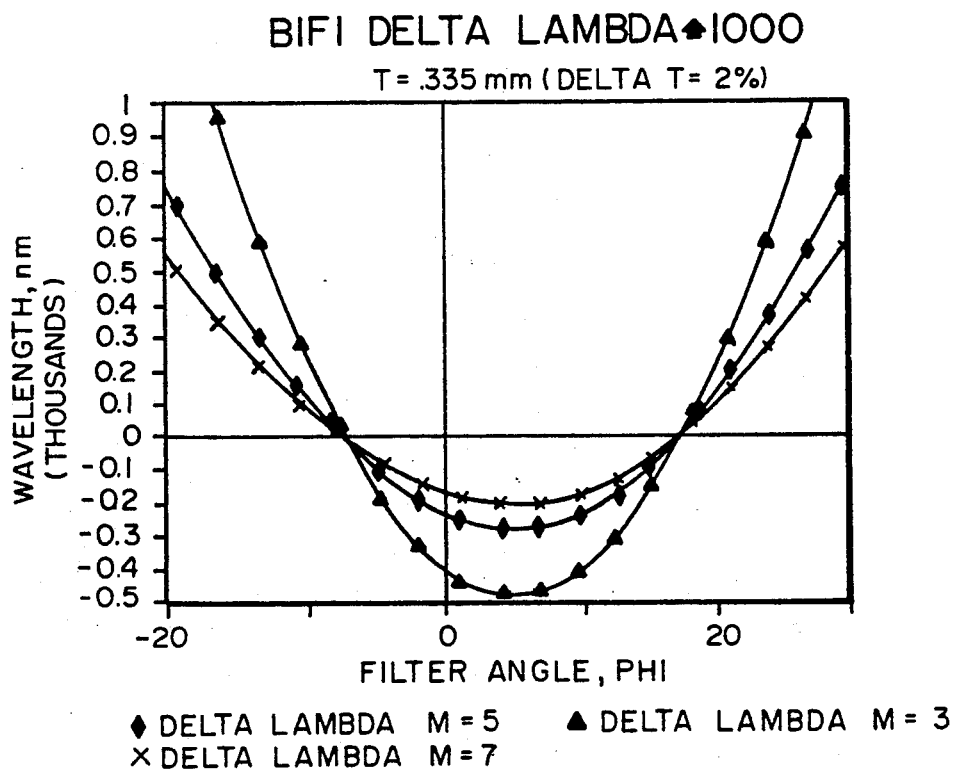

In FIGS. 32 and 33, it can be seen that the second and third tuning plates are rotated until the tuning error is zero at $-8$ and $+18$ degrees. In the prior art, the alignment was done at a wavelength near the peak of the dye curve which led to larger errors at the wings of the tuning curves. By choosing the tuning angle for the first plate at $-8$ or $+18$ degrees to establish the reference wavelength, it is possible to maximize the tuning range with low losses to be larger than could be achieved using prior art alignment methods. For example, referring to FIG. 32, error curve 100 represents the wavelength error that results because of the additional losses imposed upon the system resulting from the presence of the second and third tuning plates which have parallelism errors of 24 minutes. The wavelength error on the vertical axis represents the actual wavelength of lasing error measured relative to the wavelength of lasing that would result if the second and third tuning plates were not present. Note that the wavelength error is moderately negative at tuning angles between $-8$ and $+18$ degrees, 0 at $-8$ and $+18$ degrees and is moderately positive for tuning angles outside the range from $-8$ to $+18$ degrees. In contrast, note the wavelength tuning error curve 102 that results when the alignment method of the prior art is used. In the prior art method, the tuning angle to establish the reference wavelength is set at or near the dye curve peak which is usually between 0 and $+5$ degrees. This result is small wavelength errors for tuning angles at or near the range between 0 and $+5$ degrees but increasingly positive wavelength errors for tuning angles outside this range. Note that at the wings or extremities of the tuning error curve 102, the magnitude of the tuning error is substantially larger than the corresponding tuning error on the curve 100 where alignment is done according to the teachings of the invention.

In the structure shown in FIG. 4, the second birefringent tuning plate 72 usually has a thickness of 4 times that of the thickness T of the first plate 60. Likewise, the third birefringent tuning plate usually has a thickness of approximately 16 T. If plates of such thickness could be exactly manufactured out of quartz or other birefringent material with no error, there would be no alignment difficulty. That is, it would be possible in the case where the second plate thickness was an exact integer multiple of the first plate thickness to align the second plate 72 such that zero losses at all tuning angles would be imposed. This would only be true for light refracted through the first plate having p-polarization when the optic axis of the second plate 72 is parallel to the optic axis of the first plate 60. Likewise, if the plate 74 were exactly 16 T in thickness, it too would impose zero loss on light refracted through the second plate 72 if the optic axis of the plate 74 was aligned to be exactly parallel to the optic axis of the plate 72. However, when the plates 72 and 74 are manufactured such that small errors in their thicknesses occur, then the phase retardation of light emerging from the first plate 60 and passing through the second plate 72 is not exactly an integer multiple of one wavelength. Therefore, losses will occur at the surfaces of the plate 72. Likewise, if the plate 74 is not exactly 16 T in thickness, then the phase retardation of light passing through the plate 74 will not be an exact integer multiple of one wavelength. Therefore, losses will occur at the surfaces of the plate 74.

It has been found theoretically and by computer modelling that these manufacturing tolerance losses can be minimized if the tuning angle at the center of the tuning range is centered at approximately 5 degrees.

All these beneficial effects are made possible by knowing the proper tuning relationship specified in equation (8) above. Knowing this relationship allows the proper thickness for the first plate to be chosen out of the infinite number of possible thicknesses to achieve the beneficial effects described above without knowing equation (8), a vast amount of experimentation with many different thicknesses would have to be performed to find the correct thickness to achieve the results intrinsically specified in the tuning curves of FIG. 24. In addition, the tuning relationship of equation (8) allows calculation of tolerances in key parameters, i.e., plate thickness, plate parallelism, and plate alignment.

Although the invention has been described in terms of the preferred embodiment disclosed herein, those skilled in the art will appreciate alternative embodiments which may be employed to achieve the beneficial effects of the invention without departing from the spirit and scope of the teachings thereof. All such modifications and alternative embodiments are intended to be included within the scope of the claims appended hereto.

What is claimed is:

1. A tuning apparatus for a synchronously pumped dye laser having a resonator cavity in which a laser light beam resonates along an axis comprising:

a tuning plate having at least one surface upon which said laser light beam is incident and comprised of birefringent material having two different indices of refraction along two principal displacement directions and having an optic axis and having a thickness defined according to the following equation:

$$\lambda = \frac{\Delta n T}{m \sin([\theta_i]\theta)} \left[ 1 - \frac{\sin^2([\theta_i]\theta)}{2n^2}(1 + \sin(2\phi)) \right]$$

where, $\lambda$ = the wavelength of said resonating light which will have minimum loss and defining the lasing wavelength;

$\Delta n$ = the difference in the indices of refraction along the two principal displacement directions in said plate at the wavelength $\lambda$ defining the birefringence of said plate;

T = the thickness of the birefringent tuning plate;

m = an order number indicating a number of full wavelengths of phase retardation said resonating light will experience in passing through said tuning plate;

$\theta$ = an angle of incidence of said resonating laser light beam in said cavity on said surface of said plate;

n = the average index of refraction between said two different indices of refraction of said birefringent tuning at the wavelength $\lambda$; and $\phi$ = a tuning angle equal to $\alpha + \pi/4$ where $\alpha$ is the angle between the projection of said optic axis of said birefringent plate on said surface of the birefringent plate upon which light beam is incident to the plane of incidence containing both said axis said light beam and a normal to said surface;

said thickness T being chosen from the range from 0.1 mm to 0.5 mm such that a family of tuning curves are defined, each defining a single mode of lasing and having a single order number m and defining a relationship between said tuning angle and said resulting lasing wavelength, said thickness T being selected such that at least one said tuning curve covers a substantial portion of a desired range of lasing wavelengths; and means optically coupled to said tuning plate for suppressing satellite lobes in an autocorrelation function showing pulse shape for said synchronously pumped dye laser.

2. The apparatus of claim 1 wherein said thickness T is chosen such that said tuning angle stays smaller than the tuning angle at which tuning anomalies in the form of jumps to different wavelengths and different polarizations occur at the ends of a tuning range said tuning range defined as the range of tuning angles $\phi$ which cover the selected tuning curves and wherein said means for suppressing satellite lobes is a thickness of KZF1 glass from 1 to 1.5 millimeters thick optically contacting two opposite surfaces of said tuning plate through which said resonating light beam passes.

3. The apparatus of claim 1 wherein the thickness is chosen such that the sensitivity of the wavelength $\lambda$ to changes in the tuning angle $\phi$ is not so great as to make it difficult to achieve lasing at any particular wavelength but not so insensitive that very large changes in the tuning angle need to be made to change the wavelength of lasing appreciably.

4. The apparatus of claim 1 wherein the thickness T of the plate is chosen so that the single order tuning curve which covers the desired tuning range allows tuning which is substantially linear over the tuning range of interest.

5. The apparatus of claim 1 wherein the thickness T of the plate is chosen such that the center of the tuning range is at a tuning angle of approximately 5 degrees.

6. The apparatus of claim 1 wherein the thickness T of the plate is chosen to be 0.29 millimeters.

7. A synchronously pumped dye laser comprising:
a dye jet;
means for pumping said dye jet to excite lasing;
a resonator cavity including at least two mirrors and defining an axis for a resonating light beam defining an axis between said two mirrors which passes through said dye jet;
a tuning plate of birefringent material having two parallel surfaces upon which said light beam resonating in said cavity is incident and having two different indices of refraction along two principal displacement directions having two different indices of refraction along two different principal displacement directions having a predetermined thickness in the range from 0.1 mm to 0.5 mm defining a family of tuning curves, each curve defining a single mode of lasing and chosen so that a single mode tuning curve in a family of tuning curves inherently defined by the selection of the thickness T of said plate covers a range of desired lasing wavelengths for the particular dye being used, said first tuning plate being located such that said resonating light beam passes through said first tuning plate and makes Brewster's angle with a normal to the surface of said first plate; and
means optically coupled to said tuning plate for suppressing satellite lobes in an autocorrelation function showing pulse shape for said synchronously pumped dye laser.

8. The apparatus of claim 7 wherein the thickness of said first tuning plate is 0.297 millimeters and further comprising a second tuning plate of birefringent material wherein the thickness of the second tuning plate is four times the thickness of said first tuning plate.

9. The apparatus of claim 8 further comprising a third tuning plate of birefringent material having a thickness which is an integer multiple of the thickness of said second tuning plate and situated along said axis in said resonator cavity such that light resonating in said cavity must pass through said third tuning plate, and having an optic axis which is substantially parallel to the optic axes of said first and second tuning plates, and oriented so that the surfaces of said third tuning plate upon which light is incident form Brewster's angle between said axis and the normal to said surfaces.

10. The apparatus of claim 7 where the thickness T is selected using the following equation:

$$\lambda = \frac{\Delta n T}{m \sin([\theta_i]\theta)} \left[ 1 - \frac{\sin^2([\theta_i]\theta)}{2n^2} (1 + \sin(2\phi)) \right]$$

where,
$\lambda$ = the wavelength of the light which will have minimum loss;
$\Delta n$ = the difference in the indices of refraction along the two principal displacement directions in said first tuning plate defining the birefringent of said plate;
T = the thickness of the birefringent first tuning plate;
m = an integer indicating a number of full wavelengths of phase retardation said light will experience in passing through the birefringent first tuning plate defining an order number;
$\theta_1$ = an angle of incidence of said laser light beam in the cavity on a surface of said first tuning plate;
n = an average index of refraction of said birefringent material as between said two different indices of refraction; and
$\phi$ = an angle equal to $\alpha + \pi/4$ where $\alpha$ is an angle between a projection of an optic axis of said birefringent first tuning plate on said surface of said birefringent first tuning plate upon which said resonating light beam is incident to a plane of incidence containing both a direction of propagation vector of said resonating light beam and a normal to said surface;
said thickness T defining a family of tuning curves each of which has a different value m and defining a single mode of lasing, each said tuning curve called a single order tuning curve, T being chosen such that a single order tuning curve covers the range of lasing wavelengths of interest within a predetermined rang of tuning angles, $\phi$ centered around approximately 5°.

11. The apparatus of claim 10 wherein said first tuning plate is coated with a nonbirefringent index matching material on all surfaces through which light resonating in said cavity passes.

12. The apparatus of claim 10 wherein the thickness, is chosen such that the sensitivity of the wavelength $\lambda$ to changes in the tuning angle $\phi$ is not so great as to make it difficult to achieve lasing at any particular wavelength by choosing an appropriate tuning angle, $\phi$, but not so insensitive that very large changes in the tuning angle are necessary to change the wavelength of lasing appreciably.

13. The apparatus of claim 12 wherein the thickness, T, of the plate is chosen such that the center of said tuning range is at a tuning angle of approximately 5 degrees.

14. The apparatus of claim 10 wherein the thickness, T, of the plate is chosen so that the single order tuning curve which covers the desired dye tuning range allows tuning which is substantially linear over the tuning range of interest.

15. The apparatus of claim 14 wherein the thickness, T, of the plate is chosen such that the center of said tuning range is at a tuning angle of approximately 5 degrees.

16. The apparatus of claim 10 wherein the thickness, T, of the plate is chosen such that the center of said range is at a tuning angle of approximately 5 degrees.

17. A tuning apparatus for a dye laser having a resonator cavity having laser light resonating therein along an axis comprising:
a first tuning plate of birefringent material having a surface on which said light is incident and having two different indices of refraction along two different principal displacement directions and having an optic axis having a thickness defined according to the following equation:

$$\lambda = \frac{\Delta n T}{m \sin(\theta)} \left[ 1 - \frac{\sin^2(\theta)}{2n^2} (1 + \sin(2\phi)) \right]$$

where,

λ = the wavelength of said resonating light which will have minimum loss;

Δn = the difference in the indices of refraction along the two principal displacement directions in the anisotropic material of said first tuning plate at the wavelength λ defining the birefringence thereof;

T = the thickness of said first tuning plate;

m = an order number indicating the number of full wavelengths of phase retardation said light will experience in passing through the birefringent plate;

θ = the angle of incidence of said axis on said surface of said first tuning plate;

n = the average index of refraction between said two different indices of refraction of the birefringent material of said plate at the wavelength λ for said resonating light; and, φ = an angle equal to $\alpha + \pi/4$ where $\alpha$ is the angle between the projection of said optic axis of said birefringent first tuning plate on said surface of said birefringent first tuning plate upon which said resonating light is incident to a plane of incidence containing both said axis and a normal to said surface;

where the thickness T of said birefringent first tuning plate defines a family of tuning curves each of which has a different order value of m and defines a relationship between said tuning angle and the wavelength of lasing where said resonating light suffers minimum losses in said cavity, where T is between 0.1 mm and 0.5 mm and is chosen such that a single order tuning curve covers a desired range of lasing wavelengths of said laser light for a single dye used in said dye laser and within a predetermined range of tuning angles, φ, centered at approximately 5°;

and further comprising two substrates of nonbirefringent matches having an index of refraction which substantially matches the average index of refraction of said birefringent first tuning plate, said two substrates optically contacting the surfaces of said birefringent first tuning plate through which light resonating in said cavity passes.

18. The apparatus of claim 17 first comprising second and third birefringent tuning plates which have thicknesses which are first and second even integer multiples of the thickness of said first birefringent plate and wherein said first, second and third birefringent tuning plates have surfaces upon which said resonating light is incident which are oriented at Brewster's angle to the light beam resonating in said resonator cavity.

19. The apparatus of claim 18 further comprising a nonbirefringent plate at Brewster's angle to the light resonating in said cavity and made of a material such that light passing therethrough having other than p-polarization will suffer losses.

20. The apparatus of claim 19 wherein the thicknesses of said second and third birefringent tuning plates are integer multiples of the thickness of said first birefringent tuning plate within a selected tolerance of no larger than plus or minus 5 microns, said thickness tolerance being selected so as to not cause losses of intensity of the light resonating in said resonator cavity greater than a 0.5% single path loss in intensity.

21. The apparatus of claim 20 wherein said second birefringent plate is parallel to said first birefringent plate to within a second predetermined tolerance and said third plate is parallel to said first plate to within a third predetermined tolerance.

22. The apparatus of claim 21 wherein said second and third predetermined tolerances are such that power losses for light resonating in said resonator cavity are less than or equal to the power losses created by deviations of the thicknesses of said second and third birefringent plates within said first tolerance away from being exact integer multiples of the thickness of said first tuning plate.

23. The apparatus of claim 22 wherein said thickness of said birefringent fist tuning plate is chosen to keep a free spectral range of said dye laser from being smaller than a predetermined level where the free spectral range is defined as the spacing in Gigahertz defining the frequency of said lasing wavelength between the tuning curves of different order number M.

24. The apparatus as defined in claim 23 wherein said predetermined level for said free spectral range is defined such that no tuning curve overlaps a gain profile band of the particular dye in use within the range of tuning angles along a single order tuning curved selected for operation of said laser.

25. The apparatus of claim 24 further comprising a non-birefringent glass plate tuning anomaly suppressor located in said resonator cavity at Brewster's angle so that light resonating in said cavity must pass through said non-birefringent glass plate so as to impose losses on any light passing therethrough that has other than p-polarization.

26. The apparatus of claim 17 further comprising a non-birefringent glass plate tuning anomaly suppressor located in said resonator cavity at Brewster's angle so that light resonating in said cavity must pass through said non-birefringent glass plate so as to impose losses on any light passing therethrough that has other than p-polarization.

27. The apparatus of claim 17 wherein said first, second and third birefringent plates are aligned such the wavelength error caused by errors in thickness of said second and third birefringent plates away from being exact integer multiples of the thickness of said first birefringent plate and caused by errors in parallelism of said first, second, and third birefringent plates is zero at tuning angle, φ, of −8 degrees or +18 degrees or both.

28. A tuning apparatus for a synchronously pumped dye laser having a resonator cavity and a beam of coherent laser light resonating therein along an axis passing through a jet of dye, said tuning apparatus for providing capability to tune the wavelength of said beam causing said laser to lase at selected wavelengths within a tuning range along a tuning curve, comprising:

a first birefringent plate of material having a surface upon which the resonating laser light is incident and having an optic axis and having a thickness defined according to the following equation:

$$\lambda = \frac{\Delta nT}{m\sin(\theta)}\left[1 - \frac{\sin^2(\theta)}{2n^2}(1 + \sin(2\phi))\right]$$

where,

λ = the wavelength of the light which will have minimum loss;

Δn = the birefringence of the plate or the difference in the indices of refraction along the two principal displacement directions in the anisotropic material at the wavelength λ;

T = the thickness of the birefringent plate;

m = an order number indicating the number of full wavelengths of phase retardation the light will experience in passing through the birefringent plate;

θ = the angle of incidence of the laser light beam in the cavity on the surface of the plate;

n = the average index of refraction of the birefringent material at the wavelength w; and φ = a tuning angle equal to α + π/4 where α is the angle between the projection of said optic axis of the birefringent platen on the surface of the birefringent plate upon which said resonating light is incident and the plane of incidence containing both the direction of a propagation vector of the resonating light and a normal to said surface upon which said incident light is resonant;

a second birefringent plate having a thickness which is a first integer multiple of the thickness of said first birefringent plate, and located in said resonator cavity so as to be parallel to said first birefringent plate and so that light passing through said first birefringent plate passes through said second birefringent plate;

a third birefringent plate having a thickness which is a second integer multiple of the thickness of said first birefringent plate, and located in said resonator cavity so as to be parallel to said first birefringent plate and so that light passing through said first birefringent plate passes through said second birefringent plate;

said thickness of said first birefringent plate defining a family of tuning curves, said thickness being chosen such that a single order tuning curve covers a range of lasing wavelengths of said dye, said range centered at a predetermined angle selected to reduce wavelength error over a predetermined range of tuning angles, φ, between the wavelength of lasing by said laser if said second and third birefringent plates were not present and the actual lasing wavelength with said second and third birefringent plates present, said wavelength errors caused by thickness errors in the manufacturer of said second and third birefringent plates causing them to have other than exact integer multiples of the thickness of said first birefringent plate and by lack of parallelism between said second and third birefringent plates to said first birefringent plate; and means including a substrate of nonbirefringent KZF1 glass of a thickness from 0.8 to 1.5 mm coating each surface of said first birefringent plate through which light resonating in said cavity passes for suppressing satellite lobes in the autocorrelation function of pulse shape for pulses of greater than 2 picoseconds duration in said synchronously pumped dye laser.

29. The apparatus of claim 28 wherein said thickness of said first birefringent plate is chosen to keep a free spectral range, defined as the spacing in Gigahertz between different order tuning cures, from being smaller than an acceptable level for said tuning range, where said acceptable level is defined as no more than one tuning curve intersecting the gain profile band of the particular dye used in said laser within the range of tuning angles, φ, of the intersection between the selected tuning curved for operation and the gain profile band of the particular dye being used.

30. The apparatus of claim 29 further comprising at least one non-birefringent plate means located in said resonator cavity so as to intersect the beam of light resonating in said cavity at Brewster's angle for imposing sufficient losses on light of selected polarizations to eliminate or minimize jumps of lasing activity to non-full order wavelength solution between tuning curves when said laser is tuned under predetermined conditions to lase at wavelengths near the ends of the tuning range of a single tuning curve.

31. The apparatus of claim 30 wherein said second and third birefringent plates have a tolerance on thickness indicating the maximum error in thickness from an integer multiple of the thickness of said first birefringent plate and wherein the tolerance on the thickness of said second and third birefringent plates is sufficient to insure that first pass losses imposed upon light resonating in said resonant cavity do not exceed 0.5%.

32. The apparatus of claim 31 wherein the alignment of said second and third birefringent plates in parallel relationship to said first birefringent plate has a tolerance indicative of the maximum allowable error in parallelism and wherein the tolerance on the parallel relationship of said second and third birefringent plates is such that losses imposed upon light resonating in said resonant cavity caused by said parallelism errors is no greater than a fraction of the losses imposed by thickness error.

33. A tuning apparatus for a dye laser having a resonator cavity in which a laser light beam is resonating along an axis comprising:

a tuning plate of birefringent material having at least one surface oriented at Brewster's angle to the axis of said resonating light beam and upon which said laser light beam is incident and having at least two different indices of refraction along at least two different principal displacement directions, and having an optic axis a thickness defined according to the following equation:

$$\lambda = \frac{\Delta n T}{m \sin(\theta)} \left[ 1 - \frac{\sin^2(\theta)}{2n^2} (1 + \sin(2\phi)) \right]$$

where,

λ = the wavelength of the light which will have minimum loss;

Δn = the difference in the indices of refraction along the two principal displacement directions in the anisotropic material at the wavelength λ defining the birefringence of said plate;

T = the thickness of the birefringent tuning plate;

m = an order number indicating the number of full wavelengths of phase retardation the light will experience in passing through the birefringent plate;

θ = an angle of incidence of said laser light beam on said surface of the plate;

n = the average index of refraction between said two indices of refraction of the birefringent material at the wavelength λ;

φ = a tuning angle equal to α + π/4 where α is the angle between the projection of said optic axis of said birefringent plate on said surface of the birefringent plate upon which the light beam is incident to a plate of incidence containing both said axis along which said light beam is resonating and a normal to said surface; and n = the average index of refraction between said two different indices of refraction for said tuning plate at wavelength λ for said light beam' said thickness T being chosen so as to define a family of tuning curves, each having a different order number m and being chosen such that a single order tuning curve covers a desired range of lasing wavelengths of interest within a predetermined range of said tuning angles, $\phi$;

a plate of non-birefringent material oriented at Brewster's angle to said light beam resonating in said cavity and positioned such that said axis passes therethrough; and further comprising a layer of non-birefringent transparent material having an index of fraction which substantially matches at least one index of refraction of said plate of birefringent material, and coating at least one surface of said first birefringent plate through which said light beam resonating in said cavity passes and having a predetermined thickness sufficient to reduce satellite lobes in the autocorrelation function of pulse shape for pulses of greater than 2 picoseconds duration.

34. A tuning apparatus for a solid state laser having a resonator cavity having a resonating light beam of laser light therein defining an axis comprising:

a first tuning plate of birefringent material having two different indices of refraction along two different principal displacement directions and having an optic axis and having at least two surfaces upon which said resonating light beam is incident having a thickness T defined according to the following equation:

$$\lambda = \frac{\Delta nT}{m\sin(\theta)}\left[1 - \frac{\sin^2(\theta)}{2n^2}(1 + \sin(2\phi))\right]$$

where,

λ = the wavelength of said resonating laser light which will have minimum loss defining a lasing wavelength;

Δn = the birefringence of said first tuning plate defined as the difference in the indices of refraction along said two principal displacement directions in the anisotropic material of said first tuning plate at the lasing wavelength λ;

T = the thickness of said birefringent first tuning plate;

m = an order number indicating the number of full wavelengths of phase retardation the light will experience in passing through the birefringent first tuning plate;

θ = the angle of incidence of said laser light beam in the cavity on said surface of the plate;

n = the average index of refraction of the birefringent material of said first tuning plate at said lasing wavelength λ; and, $\phi$ = a tuning angle equal to $\alpha + \pi/4$ where $\alpha$ is the angle between the projection of said optic axis of the birefringent first tuning plate on said surface of said birefringent first tuning plate upon which the incoming resonating laser light beam is incident to a plane containing both the direction of propagation vector of said resonating laser light beam and a normal to said surface upon which said resonating laser light beam is incident;

said thickness T defining a family of tuning curves each of which is of a single order m and defining a relationship between tuning angle and lasing wavelength and said thickness T being chosen such that a single order tuning curve covers a desired range of lasing wavelengths;

a substrate of nonbirefringent material located on each surface of said first tuning plate upon which said resonating laser light beam is incident and through which light resonating in said cavity passes and having an index of refraction which substantially matches the average index of refraction of said birefringent first tuning plate and having a thickness sufficient to suppress interference effects such as satellite lobes in the autocorrelation function for pulse shape for pulses of greater than 2 picoseconds duration.

35. A solid state laser comprising:

a solid lasing medium;

a resonator cavity including at least two mirrors and defining an axis for resonating light between said two mirrors which passes through said jet dye;

a first tuning plate of birefringent material having a predetermined thickness T which defines a family of tuning curves, said thickness T chosen so that a single mode curve in the family of tuning curves covers a predetermined range of desired lasing wavelengths, and said first tuning plate being located such that light resonating in said cavity along said axis passes through said first tuning plate and makes Brewster's angle with the normal to the surface of said first plate and having a layer of material having an index of refraction which substantially matches the index of refraction of said first tuning plate on each surface of said first tuning plate through which light resonating in said cavity passes and having a thickness sufficient to suppress interference effects;

at least a second tuning plate of birefringent material having a thickness which is an integer multiple of the thickness of said first tuning plate and located such that light resonating in said cavity along said axis passes through said second tuning plate and oriented such that light incident on said second tuning plate makes Brewster's angle with said first tuning plate, and having an optic axis which is parallel with the optic axis of said first tuning plate; and a third non-birefringent plate having a thickness which is an integer multiple of the thickness of said second plate and oriented such that light resonating in said cavity passes through said third plate and makes Brewster's angle with the normal to the surface of said third non-birefringent plate; and a layer of nonbirefringent material on each surface of each of said first, second and third tuning plates through which said resonating light beam passes having an index of refraction which matches the average index of refraction of the birefringent material of said tuning plate to which each layer is optically coupled.

36. A tuning apparatus for a dye laser having a resonator cavity in which a beam of laser light is resonating therein defining an axis comprising:

a first tuning plate of birefringent material having two different indices of refraction along two different principal displacement directions and having an optic axis and having at least two surfaces upon which said resonating light beam is incident having a thickness T defined according to the following equation:

$$\lambda = \frac{\Delta n T}{m \sin(\theta)} \left[ 1 - \frac{\sin^2(\theta)}{2n^2} (1 + \sin(2\phi)) \right]$$

where, $\lambda$ = the wavelength of said resonating laser light which will have minimum loss defining a lasing wavelength;

$\Delta n$ = the birefringence of said first tuning plate defined as the difference in the indices of refraction along said two principal displacement directions in the anisotropic material of said first tuning plate at the lasing wavelength $\lambda$;

T = the thickness of said birefringent first tuning plate;

m = an order number indicating the number of full wavelengths of phase retardation the light will experience in passing through the birefringent first tuning plate where each value of m defines a tuning curve for a specific value of T;

$\theta$ = the angle of incidence of said laser light beam in the cavity on said surface of the plate;

n = the average index of refraction of the birefringent material of said first tuning plate at said lasing wavelength $\lambda$; and, $\phi$ = a tuning angle equal to $\alpha + \pi/4$ where $\alpha$ is the angle between the projection of said optic axis of the birefringent first tuning plate on said surface of said birefringent first tuning plate upon which the incoming resonating laser light beam is incident to a plane containing both the direction of propagation vector of said resonating laser light beam and a normal to said surface upon which said resonating laser light beam is incident;

said thickness defining a family of tuning curves that relate tuning angle $\phi$ to lasing wavelength, T being chosen such that a tuning curve having a single value m covers a range of lasing wavelengths of a selected dye within a predetermined range of tuning angles, $\phi$; and a non-birefringent glass plate of a thickness between 1.0 and 1.5 millimeters having an index of refraction substantially matched to at least one index of refraction of said tuning plate and located in said resonator cavity so as to be in path of said resonating light beam and optically contacting said first tuning plate so as to minimize or avoid interference effects such as satellite lobes.

37. A tuning apparatus for a dye laser having a resonator cavity having a resonating light beam of laser light therein defining an axis comprising:

a first tuning plate of birefringent material having two different indices of refraction along two different principal displacement directions and having an optic axis and having at least two surfaces upon which said resonating light beam is incident having a thickness T defined according to the following equation:

$$\lambda = \frac{\Delta n T}{m \sin(\theta)} \left[ 1 - \frac{\sin^2(\theta)}{2n^2} (1 + \sin(2\phi)) \right]$$

where, $\lambda$ = the wavelength of said resonating laser light which will have minimum loss defining a lasing wavelength;

$\Delta n$ = the birefringence of said first tuning plate defined as the difference in the indices of refraction along said two principal displacement directions in the anisotropic material of said first tuning plate at the lasing wavelength $\lambda$;

T = the thickness of said birefringent first tuning plate;

m = an order number indicating the number of full wavelengths of phase retardation the light will experience in passing through the birefringent first tuning plate where for a specific value of T the family of integers m defines a family of tuning curves;

$\theta$ = the angle of incidence of said laser light beam in the cavity on said surface of the plate;

n = the average index of refraction of the birefringent material of said first tuning plate at said lasing wavelength $\lambda$; and, $\phi$ = a tuning angle equal to $\alpha + \pi/4$ where $\alpha$ is the angle between the projection of said optic axis of the birefringent first tuning plate on said surface of said birefringent first tuning plate upon which the incoming resonating laser light beam is incident to a plane containing both the direction of propagation vector of said resonating laser light beam and a normal to said surface upon which said resonating laser light beam is incident;

said thickness T being chosen such that a single order tuning curve relating tuning angle $\phi$ to lasing wavelength covers a desired range of lasing wavelengths over a predetermined range of tuning angles, $\phi$, where each tuning curve relates the wavelength suffering minimum loss to tuning angle $\phi$;

a second tuning plate of birefringent material having a thickness which is an integer multiple of the thickness of said first tuning plate and oriented at Brewster's angle in said resonator cavity such said light beam resonating therein passes through said second tuning plate; and a non-birefringent glass plate having an index of refraction substantially matched to at least one said index of refraction of said first tuning plate and said second tuning plate and located in said resonating cavity so as to be in the path of light beam resonating therein and optically contacting said first and second tuning plates so as to minimize or avoid satellite lobes in the autocorrelation function of pulse shape for pulse durations of greater than 2 picoseconds; and a nonbirefringent plate located in said cavity at Brewster's angle and made of a polarization selective material such that light resonating in said cavity and passing therethrough which does not have p-polarization will suffer sufficient loss to extinguish lasing.

38. A tuning apparatus for a dye laser having a resonator cavity having a resonating light beam of laser light therein defining an axis comprising:

a first tuning plate of birefringent material having two different indices of refraction along two different principal displacement directions and having an optic axis and having at least two surfaces upon which said resonating light beam is incident having a thickness T defined according to the following equation:

$$\lambda = \frac{\Delta n T}{m \sin(\theta)} \left[ 1 - \frac{\sin^2(\theta)}{2n^2}(1 + \sin(2\phi)) \right]$$

where, $\lambda$ = the wavelength of said resonating light which will have minimum loss and defining the lasing wavelength;

$\Delta n$ = the birefringence of said first tuning plate defined as the difference in the indices of refraction along said two principal displacement directions in the anisotropic material of said first tuning plate at the lasing wavelength $\lambda$;

T = the thickness of said birefringent first tuning plate;

m = an order number indicating the number of full wavelengths of phase retardation the light will experience in passing through the birefringent first tuning plate;

$\theta$ = the angle of incidence of said laser light beam in the cavity on said surface of the plate;

n = the average index of refraction of the birefringent material of said first tuning plate at said lasing wavelength $\lambda$; and, $\phi$ = a tuning angle equal to $\alpha + \pi/4$ where $\alpha$ is the angle between the projection of said optic axis of the birefringent first tuning plate on said surface of said birefringent first tuning plate upon which the incoming resonating laser light beam is incident to a plane containing both the direction of propagation vector of said resonating laser light beam and a normal to said surface upon which said resonating laser light beam is incident;

said thickness T defining a family of tuning curves each of which relates tuning angle $\phi$ to lasing wavelengths, T being chosen such that a single order tuning curve having a selected value m covers a desired range of lasing wavelengths for the dye in use;

a non-birefringent glass plate having an index of refraction substantially matched to an index of refraction of said first birefringent tuning plate and located in said resonator cavity so as to be in path of light resonating in said resonator cavity and optically contacting said first birefringent tuning plate so as to minimize or avoid satellite lobes for pulse widths greater than 2 picoseconds; and a plate of non-birefringent material oriented at Brewster's angle to said light beam resonating in said cavity and made of a polarization selective which passes p-polarized light but imposes losses on non-p-polarized light material so as to create sufficient losses on wavelengths resonating in said cavity having other than p-polarization so as to extinguish lasing for non-p-polarized light.

39. In a laser having a birefringent filter plate for tuning the wavelength of light resonating in the cavity of said laser the improvement comprising a layer of nonbirefringent material coated on each surface of said birefringent filter plate through which light resonating in said cavity passes having a thickness selected to minimize satellite lobes.

40. The apparatus of claim 39 wherein said nonbirefringent material has a thickness between 1 to 1.5 mm or sufficient to suppress interference effects such as tuning discontinuities on the light resonating in said cavity at the lasing wavelength.

41. The apparatus of claim 39 wherein said nonbirefringent material is KZF1 glass.

42. The apparatus of claim 41 wherein said KZF1 glass has a thickness from 0.5 to 1.5 millimeters, preferably 1 millimeter.

43. A solid state laser comprising:
a lasing medium;
means for applying pump energy to said solid state lasing medium;
a resonator cavity to guide light emitted from said lasing medium resonating in said cavity;
a rotatable birefringent plate at Brewster's angle positioned in said cavity such that light resonating therein passes therethrough; and
a layer of nonbirefringent material on each surface of said birefringent plate through which said resonating light passes having an index of refraction which substantially matches the average index of refraction of said birefringent plate and having a thickness between 1 and 1.5 mm so as to minimize satellite lobes.

44. The apparatus of claim 42 wherein said nonbirefringent material is KZF1 glass.

45. The apparatus of claim 43 wherein said lasing medium is a dye jet and further comprising a fixed plate of nonbirefringent material in said cavity such that said resonating light makes Brewster's angle with the normal to said fixed plate, said fixed plate being of a material and orientation to impose substantial losses on resonating wavelengths having other than p-polarization.

* * * * *